United States Patent
Westwood

(10) Patent No.: US 6,800,178 B2
(45) Date of Patent: *Oct. 5, 2004

(54) METHOD OF MAKING NIFECO-O-N OR NIFECO-N FILMS FOR SHIELDS AND/OR POLES OF A MAGNETIC HEAD

(75) Inventor: John David Westwood, Allentown, PA (US)

(73) Assignee: International Business Machines Corporation, Armonk, NY (US)

( * ) Notice: Subject to any disclaimer, the term of this patent is extended or adjusted under 35 U.S.C. 154(b) by 328 days.

This patent is subject to a terminal disclaimer.

(21) Appl. No.: 09/753,433

(22) Filed: Jan. 2, 2001

(65) Prior Publication Data

US 2002/0126422 A1 Sep. 12, 2002

(51) Int. Cl.[7] .............................................. C23C 14/34
(52) U.S. Cl. .................................................... 204/192.2
(58) Field of Search ...................................... 204/192.2

(56) References Cited

U.S. PATENT DOCUMENTS

| | | | |
|---|---|---|---|
| 5,051,856 A | | 9/1991 | Narishige et al. ........... 360/126 |
| 5,112,701 A | * | 5/1992 | Katsuragawa ............... 428/694 |
| 5,503,943 A | * | 4/1996 | Sano et al. ............... 428/694 T |
| 6,110,609 A | * | 8/2000 | Hiramoto et al. ........... 428/692 |
| 6,425,989 B1 | * | 7/2002 | Westwood ............... 204/192.2 |

* cited by examiner

Primary Examiner—Rodney G. McDonald
(74) Attorney, Agent, or Firm—Ervin F. Johnston

(57) ABSTRACT

A specified amount of $N_2O$ or $N_2$ is employed in a process gas of a DC magnetron for sputter depositing single or laminated films of NiFeCo—O—N or NiFeCo—N with a high uniaxial anisotropy $H_K$ after annealing these films along their hard axes. The films can be used for shield layers and/or pole piece layers in a magnetic head.

22 Claims, 18 Drawing Sheets

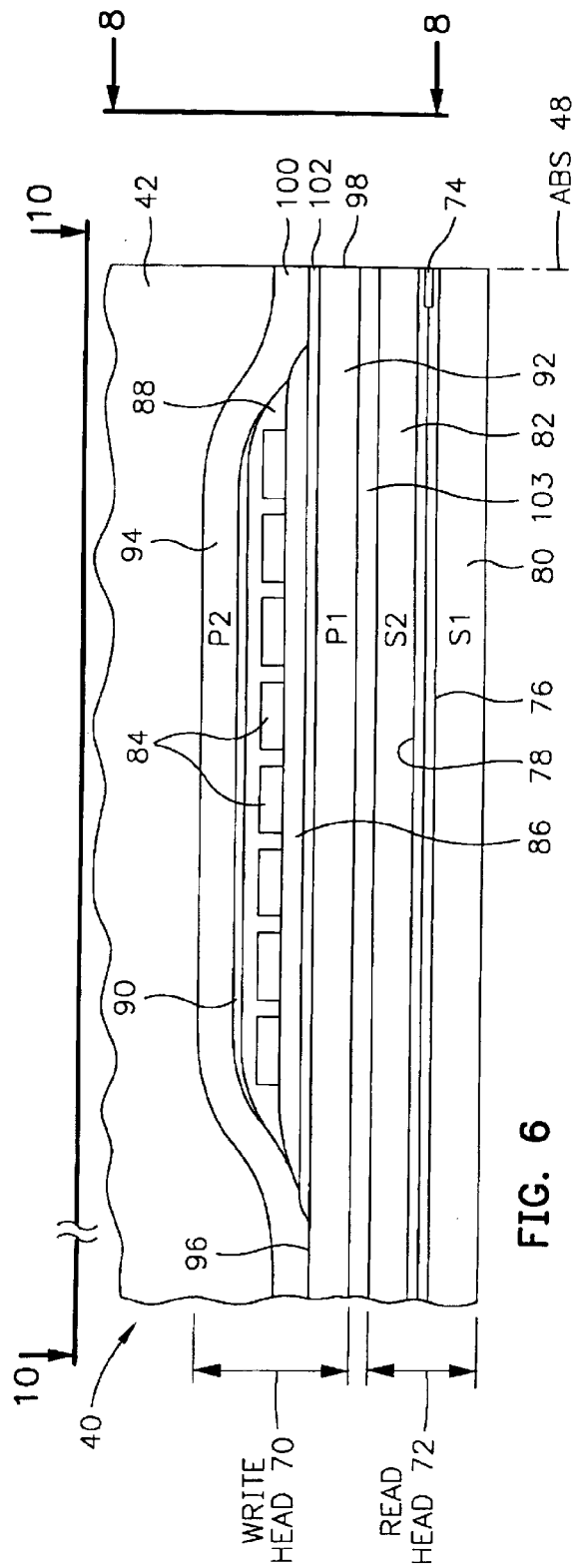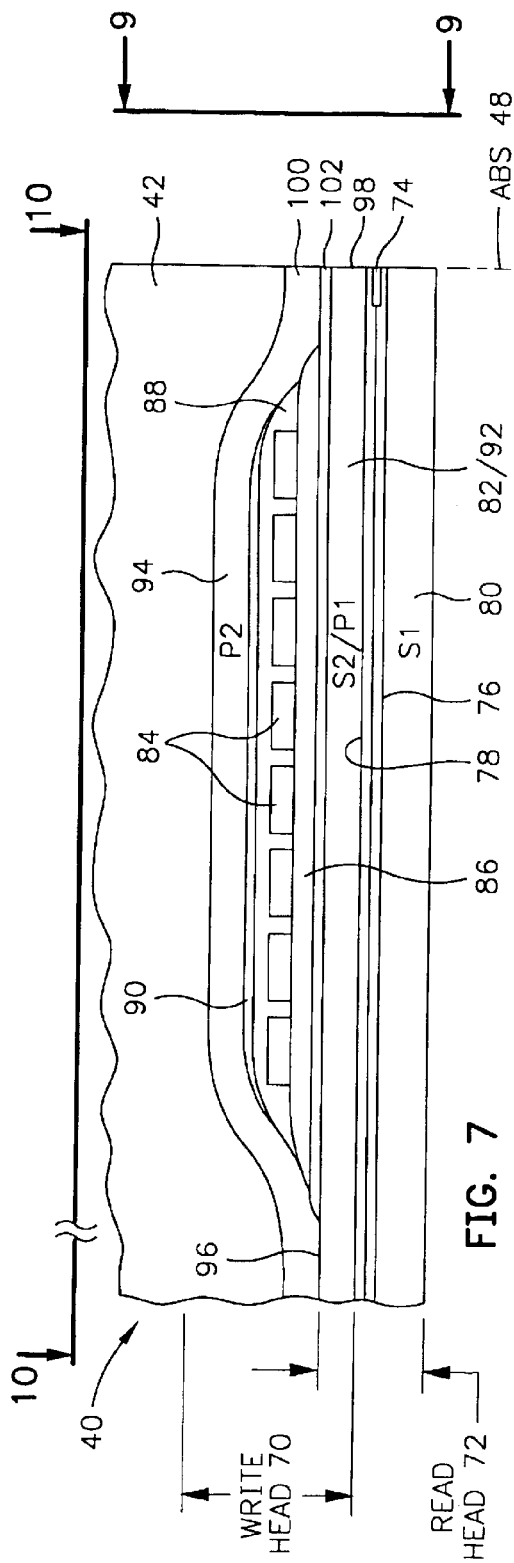

(ABS)

(EXAMPLE I)

(EXAMPLE II)

(EXAMPLE V)

(EXAMPLE XIV)

(EXAMPLE XV)

NiFeCo[-O]-N AFTER HARDBAKE
ANNEALING OR RESETTING
IN THE PRESENCE OF A FIELD
PERPENDICULAR TO THE ABS

WRITE OR DISK FIELDS

METHOD OF MAKING NIFECO-O-N OR NIFECO-N FILMS FOR SHIELDS AND/OR POLES OF A MAGNETIC HEAD

BACKGROUND OF THE INVENTION

1. Field of the Invention

The present invention relates to a method of making NiFeCo—O—N or NiFeCo—N films for shields and/or poles of a magnetic head and, more particularly, to a method of employing unique process conditions in a DC magnetron for forming such films.

2. Description of the Related Art

The heart of a computer is an assembly that is referred to as a magnetic disk drive. The magnetic disk drive includes a rotating magnetic disk with write and read heads that are suspended by a suspension arm above the rotating disk. An actuator swings the suspension arm, placing the write and read heads over selected circular tracks on the rotating disk. The write and read heads are directly mounted on a slider that has an air bearing surface (ABS). The suspension arm biases the slider into contact with the surface of the disk when the disk is not rotating. When the disk rotates, air is swirled by the rotating disk adjacent the ABS of the slider, causing the slider to ride on an air bearing a slight distance from the surface of the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in insulation layers (insulation stack) with the insulation stack being sandwiched between first and second pole piece layers (P1 and P2). A gap is formed between the first and second pole piece layers by a nonmagnetic gap layer at the air bearing surface (ABS) of the write head. The pole piece layers are connected at a back gap. Current conducted to the coil layer induces a magnetic field into the pole pieces that fringes across the gap between the pole pieces at the ABS. The fringe field writes information in tracks on moving media, such as in circular tracks on a rotating disk.

In recent read heads, a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic layer. A spin valve sensor is sometimes referred to as a giant magnetoresistive (GMR) sensor. When a spin valve sensor employs a single pinned layer it is referred to as a simple spin valve sensor. In the read head the spin valve sensor is located between first and second read gap layers and the read gap layers are located between first and second shield layers (S1 and S2).

The shield layers (S1, S2) and pole piece layers (P1, P2) are in close proximity to the read sensor. Because of this proximity, it is important that the layers be magnetically stable. In order to achieve this, the shield or pole layers are formed by plating or sputter deposition in the presence of a magnetic field that is parallel to the ABS in the plane of the shield or pole layer. The field orients the easy axis (e.a.) of the shield or pole layer in the direction of the field, namely parallel to the ABS and in the plane of the shield or pole layer. This orientation also means that the magnetic domains in the shield or pole layer in the vicinity of the sensor are also aligned with their longitudinal axes parallel to the ABS in the plane of the shield or pole layer. It is important that these domains retain their orientation as formed and not move around when subjected to extraneous fields such as fields from the write head or fields from the rotating magnetic disk. When these magnetic domains move, noise is generated which is referred to in the art as Barkhausen noise. This noise seriously degrades the read signal of the read head. Further, if the magnetic domains do not come back to their original position, the shield or pole layer exerts a differently oriented field on the free layer of the spin valve sensor. This changes the magnetic bias on the free layer causing read signal asymmetry.

There are numerous materials which may be used in the construction of shield layers (S1 and S2) and pole piece layers (P1 and P2), the most common being NiFe. Nickel iron (NiFe), with a composition typically of approximately $Ni_{81}Fe_{19}$ (wt. %), is a soft magnetic material that provides good shielding of the spin valve sensor from magnetic fields except within the read gap where signals are sensed by the sensor. Nickel iron (NiFe) also has near zero magnetostriction so that after lapping the head to form the ABS there is near zero stress induced anisotropy. Unfortunately, however, nickel iron (NiFe) has a low intrinsic magnetic anisotropy ($H_K$). Intrinsic magnetic anisotropy is the amount of applied field required to rotate the magnetic moment of the layer 90 degrees from an easy axis orientation. The intrinsic magnetic anisotropy of nickel iron (NiFe) is 2–5 oersteds (Oe). After the first shield layer (S1) and second shield layer (S2) layer are formed, they are subjected to unfavorable magnetic fields that are required in subsequent processing steps. The insulation layers of the insulation stack, which are typically photoresist layers, are hard bake annealed in the presence of a magnetic field which is directed perpendicular to the ABS for the purpose of maintaining the magnetic spins of the antiferromagnetic pinning layer in the spin valve sensor oriented in a direction perpendicular to the ABS. The hard bake anneals are typically at least three high temperature anneals with each anneal typically being performed at around 232° C. for 400 minutes. These annealing steps reduce the anisotropy field $H_K$ of nickel iron (NiFe) to very low values of 0–1 Oe.

The field typically employed for maintaining the spins of the pinning layer during hard bake of the insulation stack is about 1500 Oe. Because of the low intrinsic magnetic anisotropy of a nickel iron (NiFe) shield layer, for instance, the aforementioned anneals in subsequent processing steps can cause the easy axis and the magnetic domains of the shield layer to switch their orientation such that they are no longer parallel to the ABS. The magnetic field present in these anneals reduces or destroys the intrinsic anisotropy field that was created in the nickel iron (NiFe) when it was originally formed and may create an anisotropy field perpendicular to the ABS. This is a very unfavorable orientation for magnetic domains of a shield layer. When the shields are subjected to perpendicular fields from the write head during the write function or subjected to perpendicular fields from the rotating magnetic disk the magnetic domains will move. This causes Barkhausen noise which degrades the read signal and causes a potential change in biasing of the spin valve sensor which results in read signal asymmetry.

Some shield materials such as Sendust that require high temperature (475° C.) annealing on the easy axis can withstand subsequent hard axis annealing at 230–270° C. Others such as plated 80/20 NiFe or CoTaZr have been shown to be stabilized to some degree by an initial anneal on the easy axis at a higher temperature, such as 280° C., than will be encountered during later processing. This strategy may be workable for S1, which is formed before the GMR sensor, but not for S2, which must be made after the GMR sensor has been deposited. Annealing on the easy axis is not acceptable for many exchange materials employed in GMR sensors. Other materials considered for write head and shield materials, such as FeN, FeAlN, FeTaN, FeZrN, FeRuN and CoTaZr reduce or even switch $H_K$ in conventional processing.

In general, it is desirable to minimize the reduction of $H_K$ that occurs in hard axis annealing, and it is particularly desirable that this be done while simultaneously achieving low hard axis coercivity, $H_{CH}$, and near zero magnetostriction λ for the process conditions used for the GMR wafers. Accordingly, there is a strong-felt need for a material for the first shield layer (S1), the second shield (S2) and first and second pole piece layers (P1 and P2) that will remain sufficiently stable after being subjected to heat and magnetic fields employed in subsequent process steps without preannealing along the easy axis.

SUMMARY OF THE INVENTION

I employ NiFeCo alloys (approximately $(Ni_{0.81}Fe_{0.19})_{100-x}Co_X$ (wt %), where 0.5<X<25) for increasing $H_K$. These alloys have $H_K$ in the range of 5–25 Oe as-deposited or after easy axis annealing. It has been found, however, that NiFeCo films sputtered under a variety of conditions all lose anisotropy, and in some cases switch their easy axis direction, when subjected to the hard axis annealing conditions in the present hard bake anneal process (232° C., 400 min). In addition, thick sputtered NiFeCo films (1–2 μm), even those with near-zero magnetostriction, have vertical anisotropy. It is desirable to improve sputtered NiFeCo films so they possess high anisotropy, low coercivity, and in-plane anisotropy after GMR head processing.

I have found that doping NiFeCo with $N_2O$ or $N_2$ greatly increases $H_K$ after hard axis annealing and that when laminated with, for example, alumina or silica, thick structures can be sputter deposited with excellent in-plane anisotropy. Approximately 1.8 μm thick films were sputter deposited on $Al_2O_3$—TiC ceramic substrates with lapped undercoat alumina from a target with composition $Ni_{73.2}Fe_{18.1}Co_{8.7}$ (wt %) in a Balzers Z660 sputtering system using DC magnetron at a power of 1750 W, gas pressure of $2.0 \times 10^{-3}$ mbar, and no substrate bias. The gas was a mixture of Ar and either $N_2O$ or $N_2$. After deposition, the films were annealed three times on the hard axis at 232° C. for 400 min in a magnetic field of approximately 1500 Oe. A typical film after annealing had an $H_K$ of 10.8 Oe with in-plane anisotropy.

An object of the present invention is to provide a method of making high uniaxial anisotropy $H_K$ films after hard axis annealing.

Another object is to provide a method of making the foregoing films with low hard axis and easy axis coercivities and low magnetostriction.

A further object is to provide a method of making the foregoing films into unique laminations which are especially useful for second pole piece layers of a write head.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
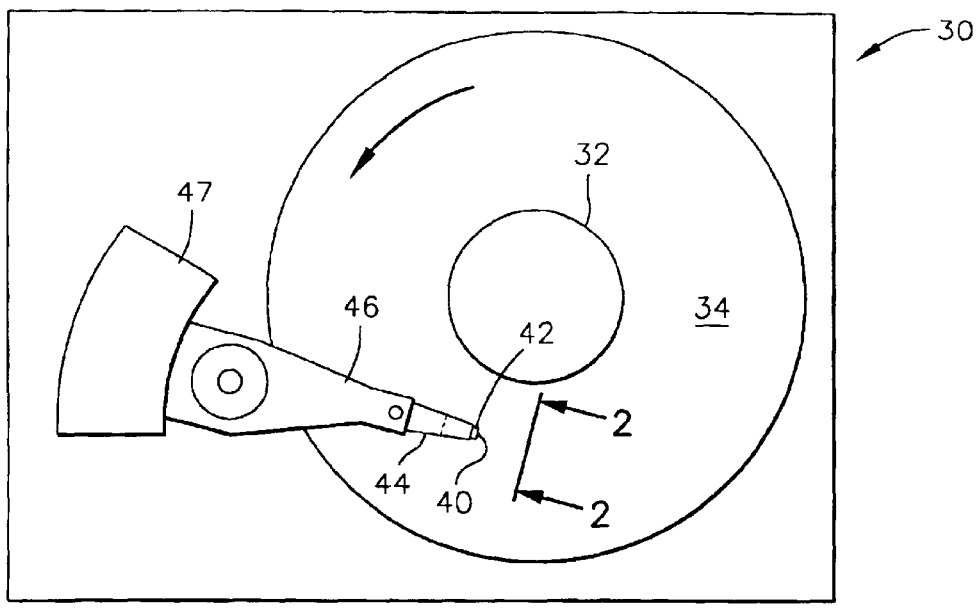
FIG. 1 is a plan view of an exemplary magnetic disk drive.
Figure 2:
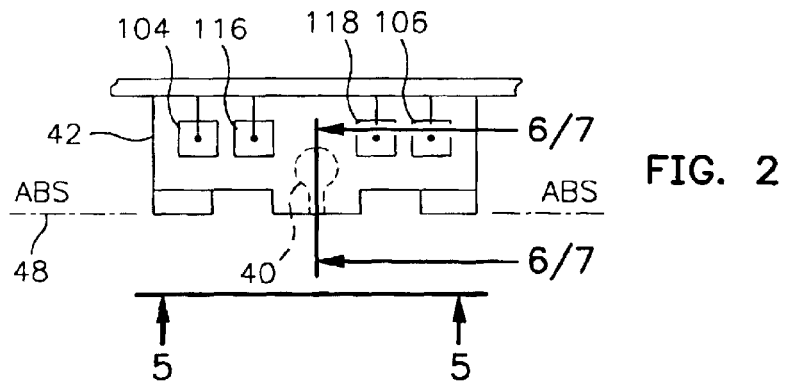
FIG. 2 is an end view of a slider with a magnetic head of the disk drive as seen in plane 2—2.
Figure 3:
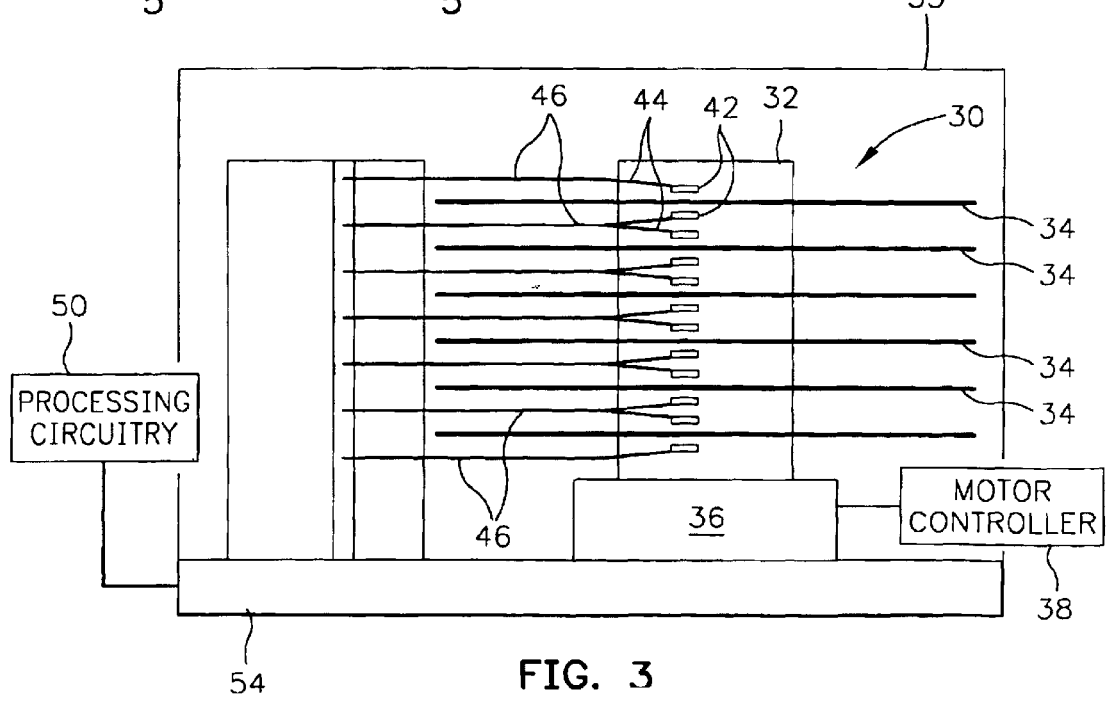
FIG. 3 is an elevation view of the magnetic disk drive wherein multiple disks and magnetic heads are employed.
Figure 4:
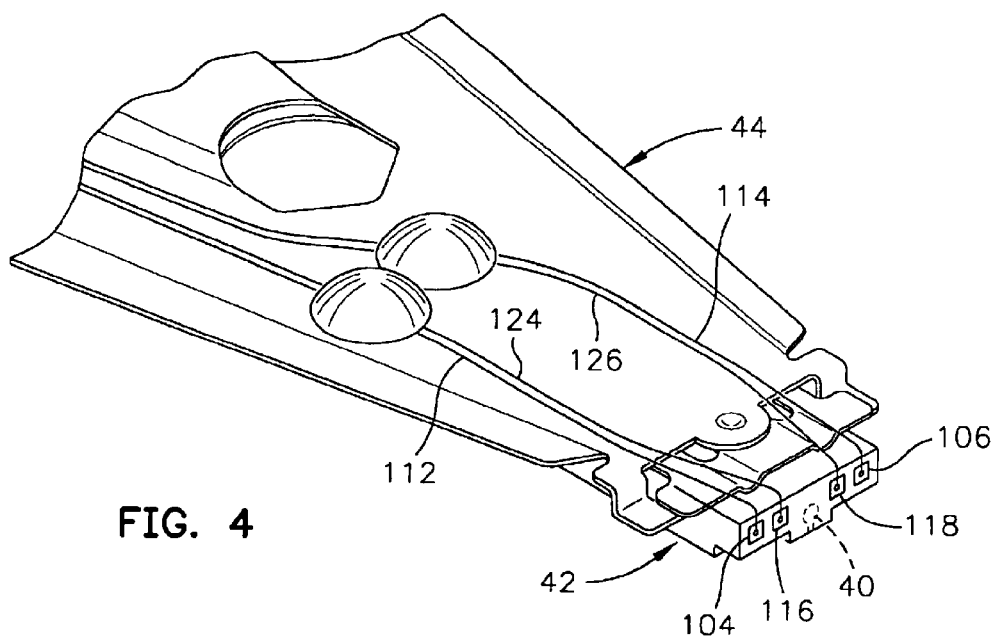
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing 55, as shown in FIG. 3.

Figure 5:
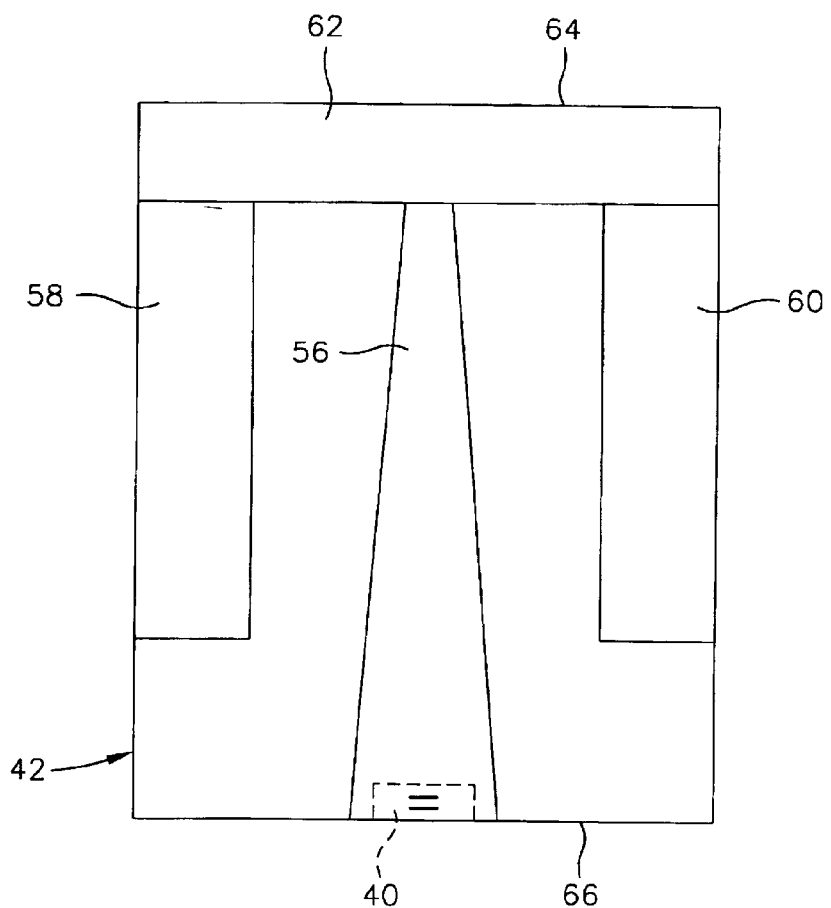
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
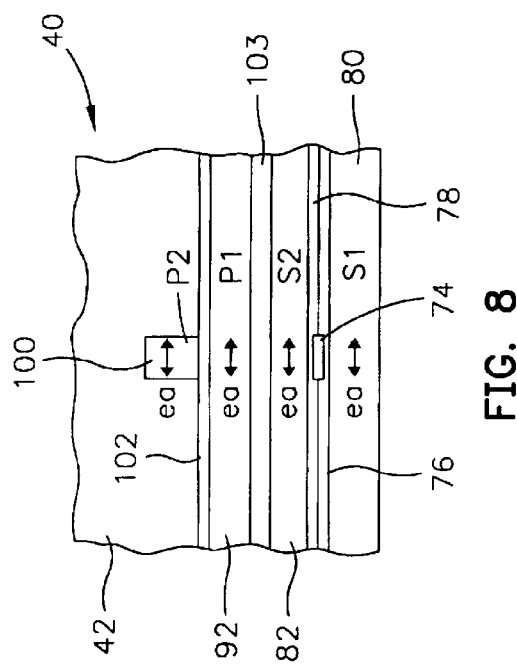
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing an AP pinned spin valve sensor 74. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
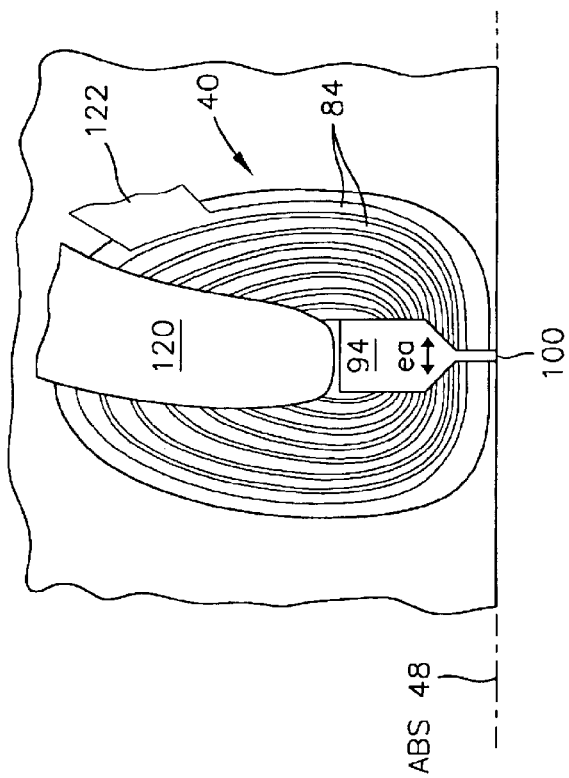
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
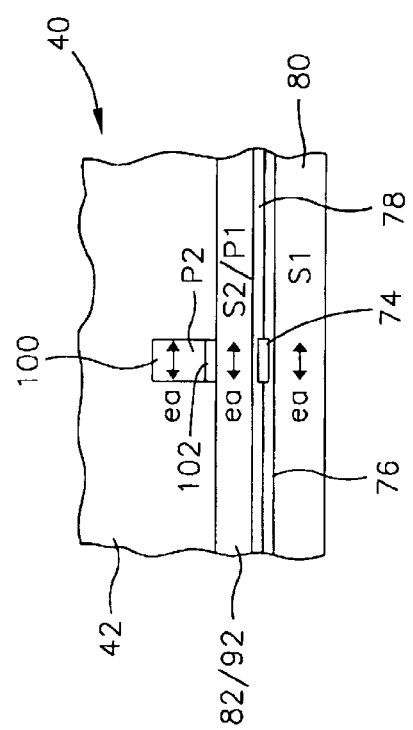
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
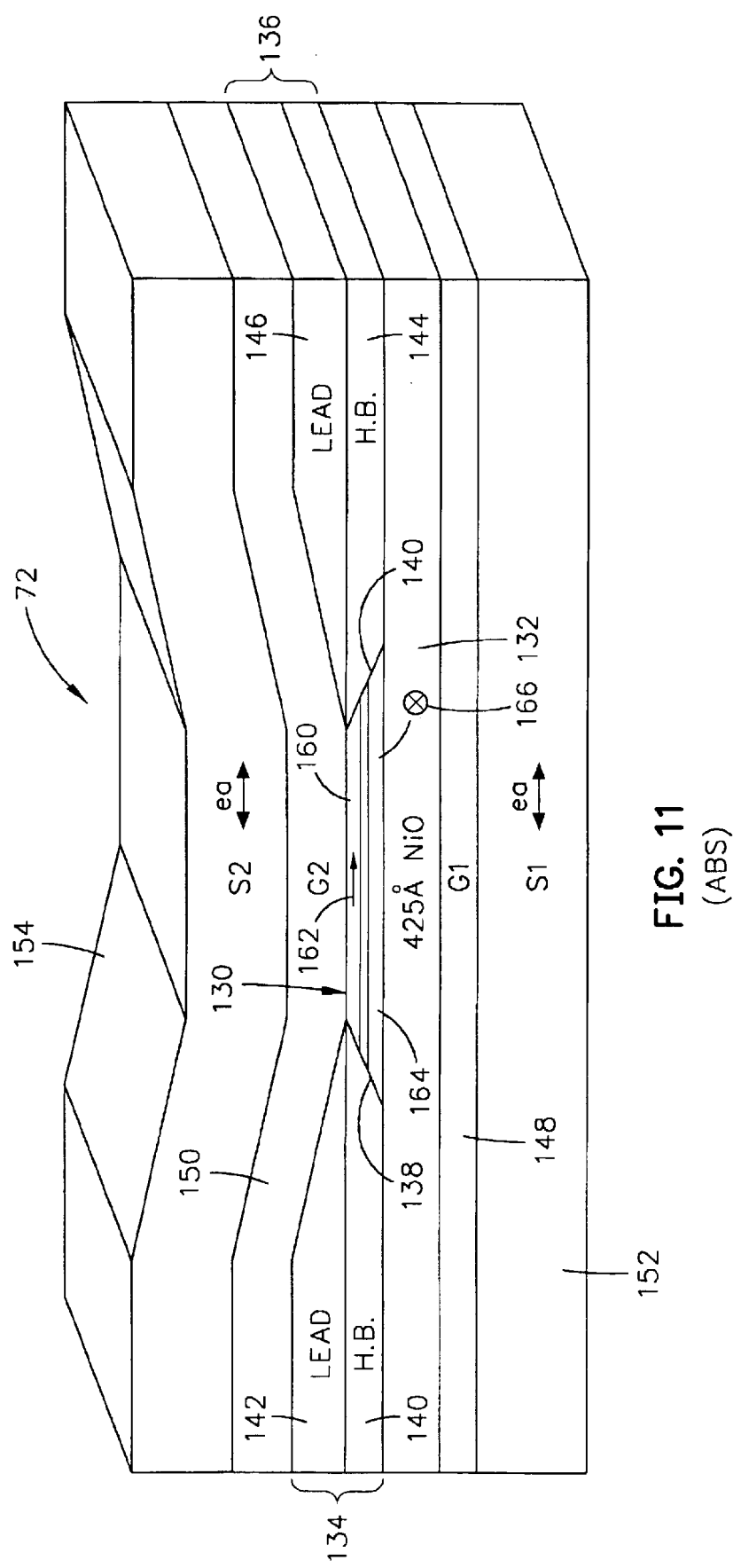
FIG. 11 is an isometric ABS illustration of a read head which employs a pinned spin valve (SV) sensor.

FIG. 11 is an isometric ABS illustration of the read head 72 shown in FIG. 6 or 7. The read head 72 has a spin valve sensor 130 which is located on an antiferromagnetic (AFM) pinning layer 132. The spin valve 130 has an antiferromagnetic (AFM) pinned layer 131 that has a magnetic moment pinned by the magnetic spins of the pinning layer 132 in a direction perpendicular to the ABS, such as into the paper as shown by ⓧ. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layer 134 includes a first hard bias layer 140 and a first lead layer 142 and the second hard bias and lead layer 136 includes a hard bias layer 144 and a lead layer 146. The hard bias layers 140 and 144 produce magnetic fields that extend longitudinally through the spin valve sensor 130 for stabilizing its magnetic domains. The AFM pinning layer 132, the spin valve sensor 130 and the first and second hard bias and lead layers 134 and 136 are located between nonmagnetic electrically insulative first and second gap layers 148 and 150. The first and second gap layers 148 and 150 are, in turn, located between a first shield layer (S1) 152 and a second shield first pole piece (S2) layer 154 (as shown in the piggyback head configuration of FIG. 6). The second shield layer may also be the first pole piece layer (S2/P1) in a merged head (as shown in the merged head configuration of FIG. 7).

As can be seen from FIGS. 8–11 the ferromagnetic layers S1, S2, P1, P2 and S2/P1 have easy axes (ea) which are oriented parallel to the ABS and parallel to the surface planes of the layers. As shown in FIG. 1 the sensor 130 has a free layer 160 with its magnetic moment 162 oriented parallel to the ABS and a pinned layer 164 which has a magnetic moment 166 pinned perpendicular to the ABS, either toward or away from the ABS, by the magnetic spins of the pinning layer 132. During the making of the read head hard axis annealing (high temperature in the presence of a field along the hard axis of the ferromagnetic layers S1, S2, P1 and P2) to preserve the exchange coupling field between the pinning layer 132 and the pinned layer 164 seriously degrades the magnetic anisotropy of these ferromagnetic layers when formed according to prior art processes. This renders the read head inoperative.

The Invention

I have found that films constructed from NiFeCo—N or NiFeCo—O—N, hereafter designated as NiFeCo[—O]—N, have improved resistance to hard axis annealing. The NiFeCo[—O]—N films of the present invention can be made to retain magnetic anisotropy after hard axis annealing and have stable domain structures. The NiFeCo[—O]—N films are ideal for shield layers (S1, S2), pole layers (P1, P2), combined second shield/pole layer (S2/P1), bilayer P1 and yoke applications due to higher $H_K$ and lower hard axis coercivity $H_{CH}$ after hard axis annealing.

I have found that using $N_2O$ as the vehicle for delivering oxygen to the oxygen-containing films is very beneficial from the standpoint of process control. In the prior art, $O_2$ is used to provide oxygen. The difficulty with $O_2$ is that it reacts with the target and metal coating in the deposition system. This reaction removes $O_2$ from the process gas. The amount of oxygen available for reaction with the film therefore depends on the prior condition of the entire chamber. Thus, reactive processes with oxygen are notoriously sensitive and difficult to control. I have found that using $N_2O$ as the reactive gas avoids this problem since it does not react with the bare metal surfaces in the chamber. In my work, the process has been very repeatable, and has exhibited none of the hysteretic behavior that is typical of processes with $O_2$. Using $N_2O$ with Ar rather than $O_2$ with Ar as the reactive gas produces stable process behavior. This stability is a major advantage for a manufacturing process.

Figures 12, 13:
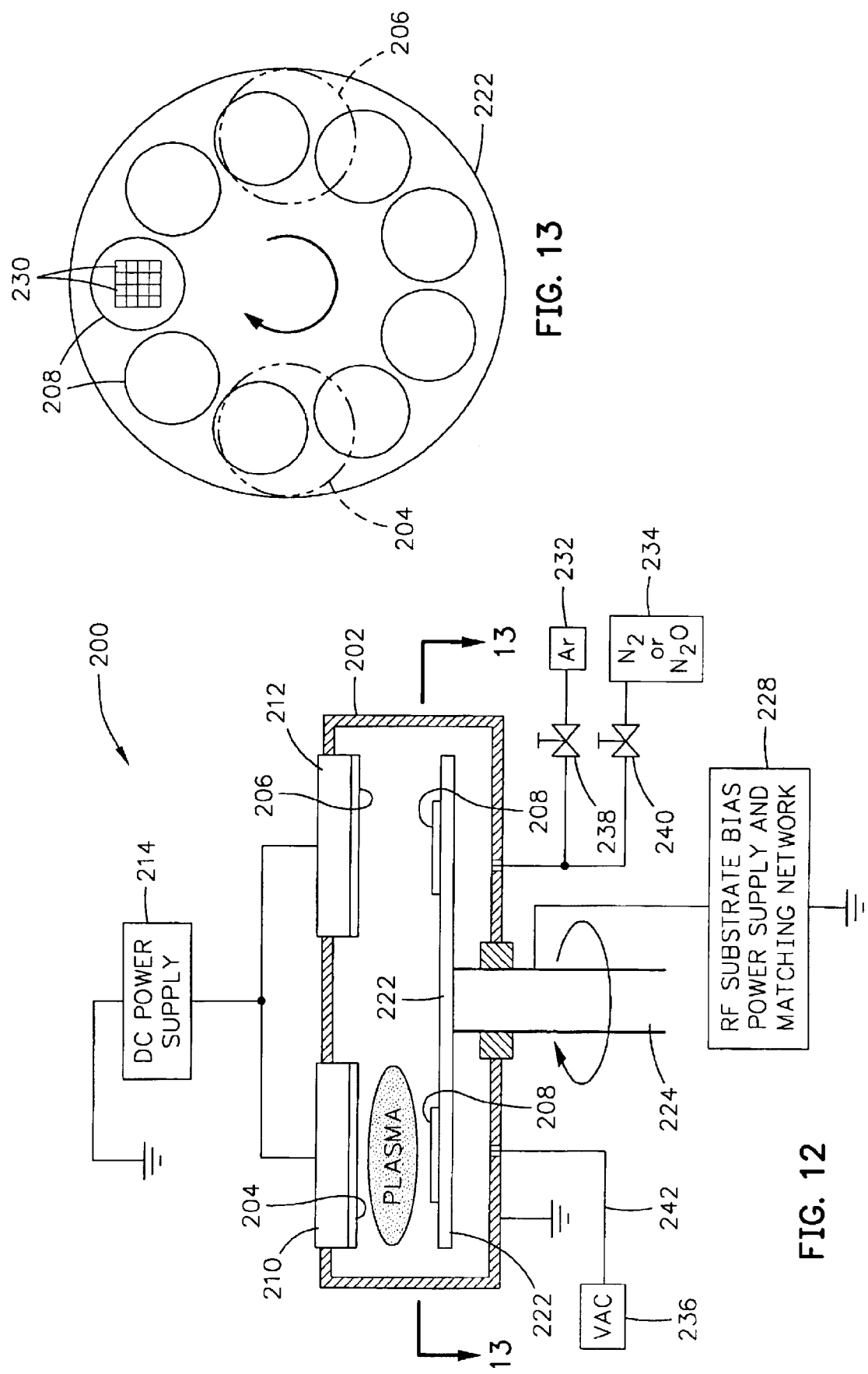
FIG. 12 is a schematic illustration of a DC magnetron sputtering system which may be employed in the present invention.
FIG. 13 is a view taken along plane 13—13 of FIG. 12.

An exemplary direct current (DC) sputtering system 200 employed in the present invention is illustrated in FIGS. 12 and 13. As shown in FIG. 12 the system includes a sputtering chamber 202, first and second cathode targets 204 and 206 within the sputtering chamber, a plurality of wafer substrates 208 in the chamber where the ferromagnetic layers are to be formed, first and second magnetron cathode assemblies 210 and 212 with the targets 204 and 206 located between the magnetron arrays (not shown) inside the cathode assemblies and the wafer substrates 208, and a DC power supply 214 for applying DC power to the magnetron cathode assemblies 210 or 212. The wafer substrates 208 are electrically connected to a conductive turntable 222 which is rotated continuously under the targets by a conductive shaft 224. An RF power supply and matching network 226 optionally supplies a substrate bias to the wafer substrates 208 via the shaft 224 and the turntable 222. As shown in FIG. 13, rows and columns 230 of read write magnetic heads may be fabricated on each wafer substrate 208. An argon (Ar) supply 232 and a nitrogen ($N_2$) or nitrous oxide ($N_2O$) supply 234 are connected to the sputtering chamber via mass flow controllers for introducing precisely controlled flows of argon and nitrogen or nitrous oxide gases into the chamber. Before introducing these gases the chamber is pumped to high vacuum by a vacuum pump system 236. Thereafter, mass flow controllers 238 and 240 control the flows of the gases to produce a selected mixture of the gases in the chamber. A selected pressure is maintained by the flow of gas into the chamber and evacuation of the gas from the chamber through a vacuum line 242 between the chamber and the vacuum pump system 236. Optionally, the vacuum line 242 may have an adjustable valve (not shown) for adjusting pressure. In the following examples, the turntable 222 is continuously rotated during sputter deposition.

EXAMPLES I–VI

Examples I–VI are shown in Chart A hereinbelow wherein Chart A details magnetic properties of selected NiFeCo based laminates approximately 1.8 μm thick after hard axis annealing. In each of Examples I–VI a DC magnetron sputtering system, as shown in FIGS. 12 and 13, was employed with a $Ni_{73.2}Fe_{18.1}Co_{8.7}$ (wt %) target. The process gases were Ar, $N_2O$ and Ar, or $N_2$ and Ar. Power was 1750W and the pressure was $2.0 \times 10^{-3}$ mbar. The substrate bias was zero. The substrate was $Al_2O_3$—TiC ceramic with lapped alumina undercoat. The film structure was a lamination of four films of the magnetic films with thin interlayers of 25 Å $SiO_2$ or 18 Å alumina. The film structures were annealed three times in an oven at 232° C. for 400 minutes along the hard axis. The easy axis of the films was established by employing the field from the magnets in the DC magnetron wherein each easy axis is in the plane of the film (major plane as contrasted to edge and side planes) and parallel to the ABS for a shield or pole piece of a magnetic head. The aforementioned hard axis is perpendicular to the aforementioned easy axis. Chart A shows for each example the film structure, the process gas, the uniaxial anisotropy $H_K$, the hard axis coercivity $H_{CH}$, the easy axis coercivity $H_{CE}$, the magnetostriction λ and anisotropy type, which is either vertical or in-plane. Vertical anisotropy is extremely undesirable for shields and poles in magnetic recording heads. The laminated structure in Example II with 3.2% $N_2O$ in Ar has excellent soft in-plane properties and near zero magnetostriction after multiple hard axis anneals. The films in Examples I and III with no $N_2O$ and 4.8% $N_2O$ have high coercivities and vertical anisotropy. Thus, with properly selected conditions of pressure and substrate bias (none in this case), introduction of a prescribed amount of $N_2O$ dramatically improves the film properties.

Figure 14:
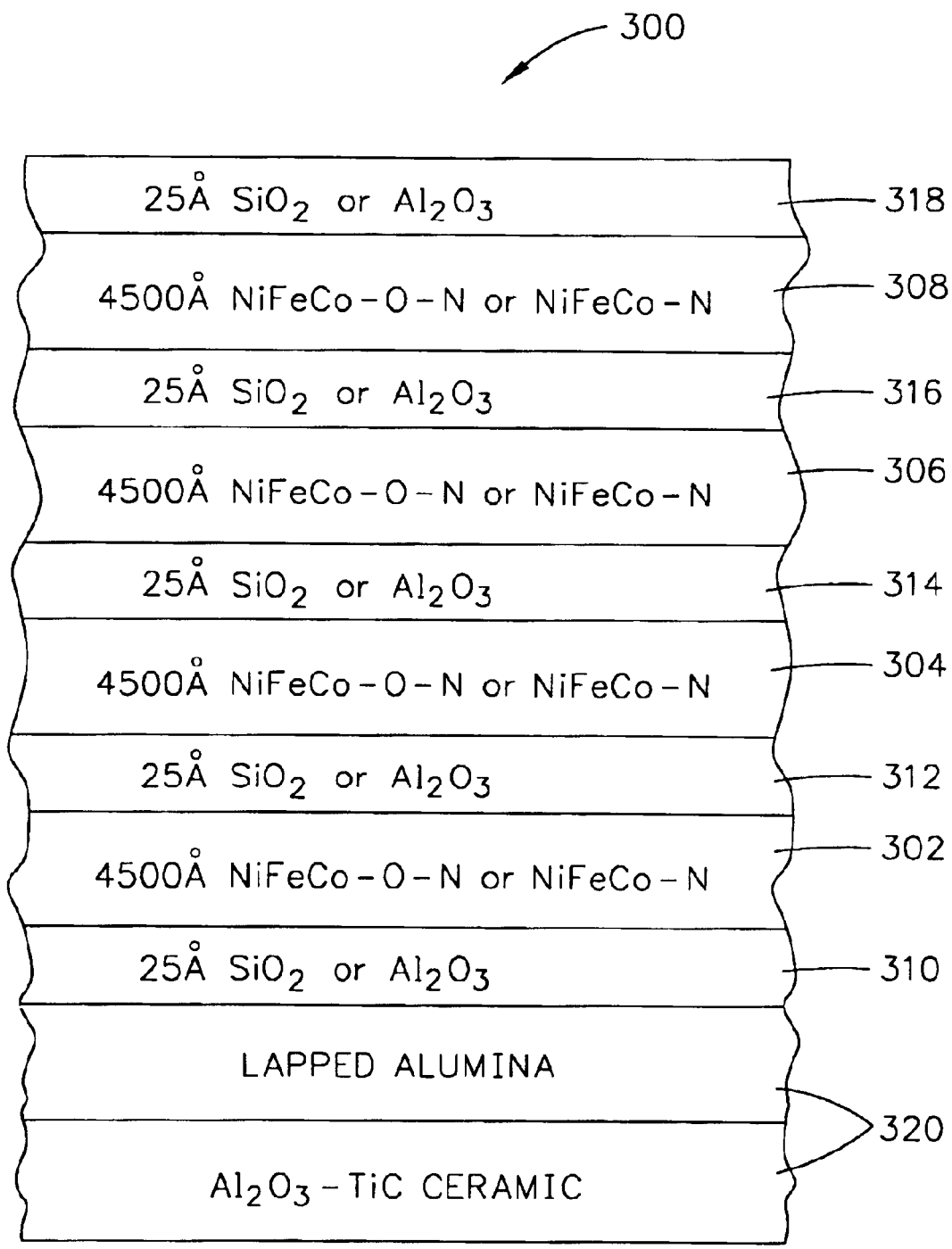
FIG. 14 is a schematic cross-sectional illustration of various layers employed in Examples I–VI.

FIG. 14 is a schematic illustration of film structures 300 for Examples I–VI, which includes four magnetic films 302, 304, 306 and 308, which are 4500 Å of NiFeCo—O—N or NiFeCo—N with amorphous interlayers 310, 312, 314, 316 and 318, which are 25 Å of $SiO_2$ or 18 Å of $Al_2O_3$. The film structure is on a ceramic substrate 320 of $Al_2O_3$—TiC and lapped alumina.

Figure 18:
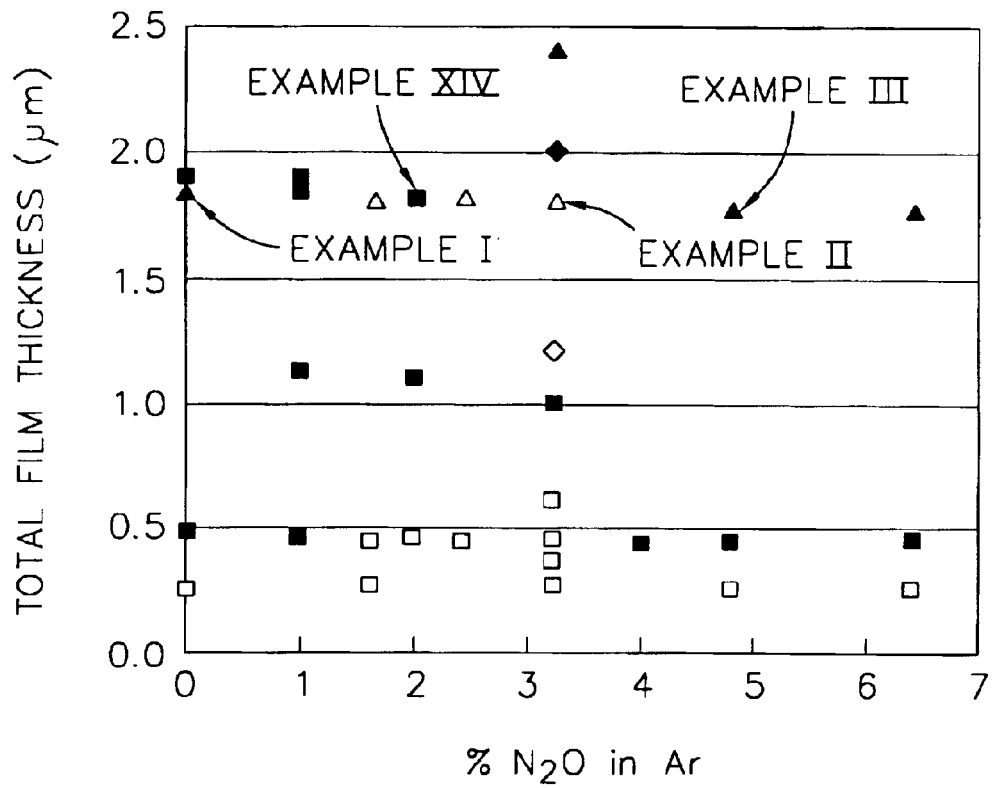
FIG. 18 is a plot of various single layer films and laminated films made in a DC magnetron sputtering system with various percentages of $N_2O$ in Ar and various total film thicknesses.
Figure 19:
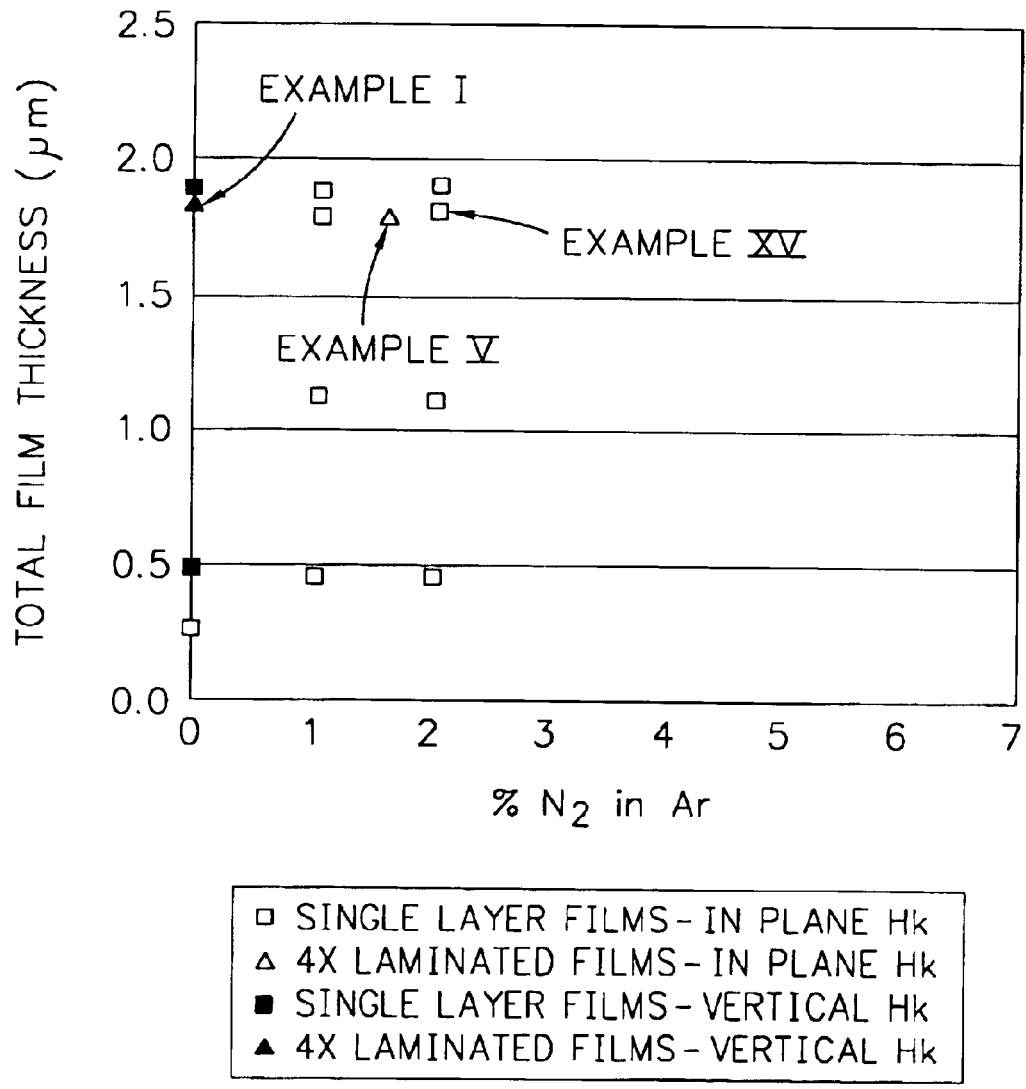
FIG. 19 is a plot of various single layer films and laminated films made in a DC magnetron sputtering system with a process gas having various percentages of $N_2$ in Ar and various total film thicknesses.

FIG. 18 is a plot of various percentages of $N_2O$ in Ar as a process gas in the DC magnetron versus various total film thicknesses for single layer films and various laminated films wherein Examples I and II are shown along with other single layer films and various laminated films for comparison purposes. A plot is shown in FIG. 19 showing various percentages of $N_2$ in Ar as a process gas in the DC magnetron versus total film thicknesses of single layer films and various laminated films with Example V shown for comparison with other single layer films and various laminated films.

Figure 20:
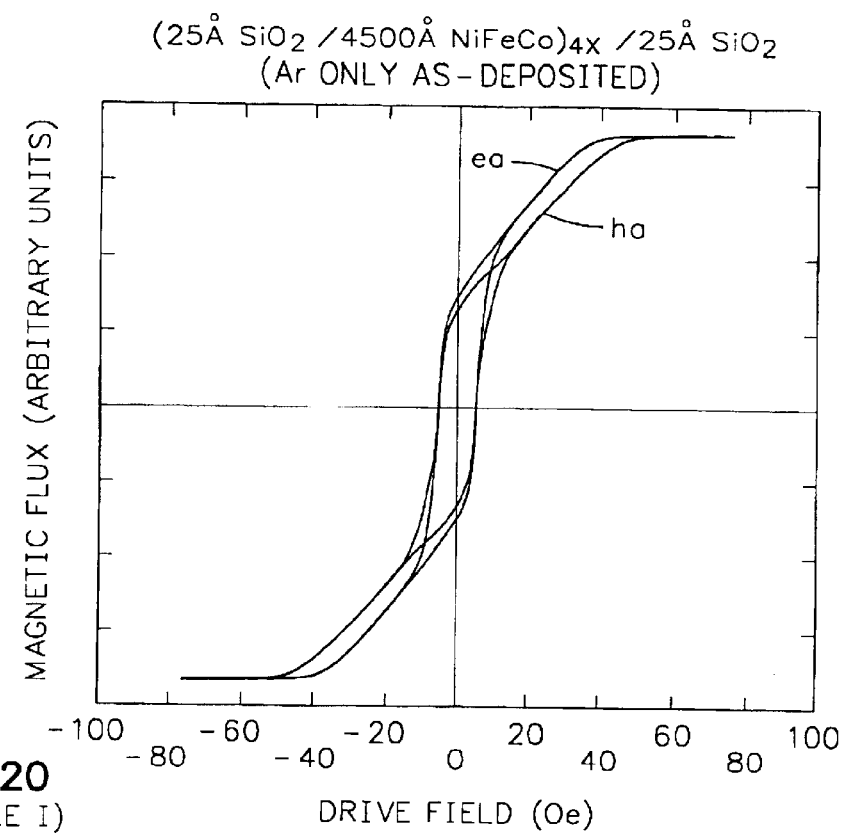
FIG. 20 is a B/H loop for Example I.
Figure 21:
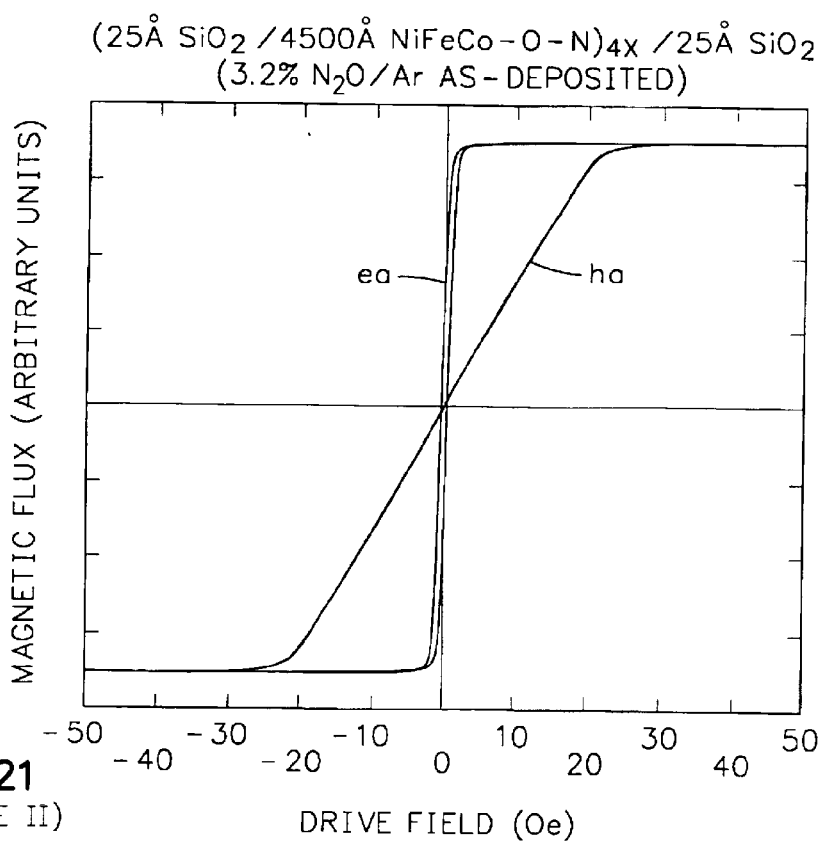
FIG. 21 is a B/H loop for Example II.
Figure 22:
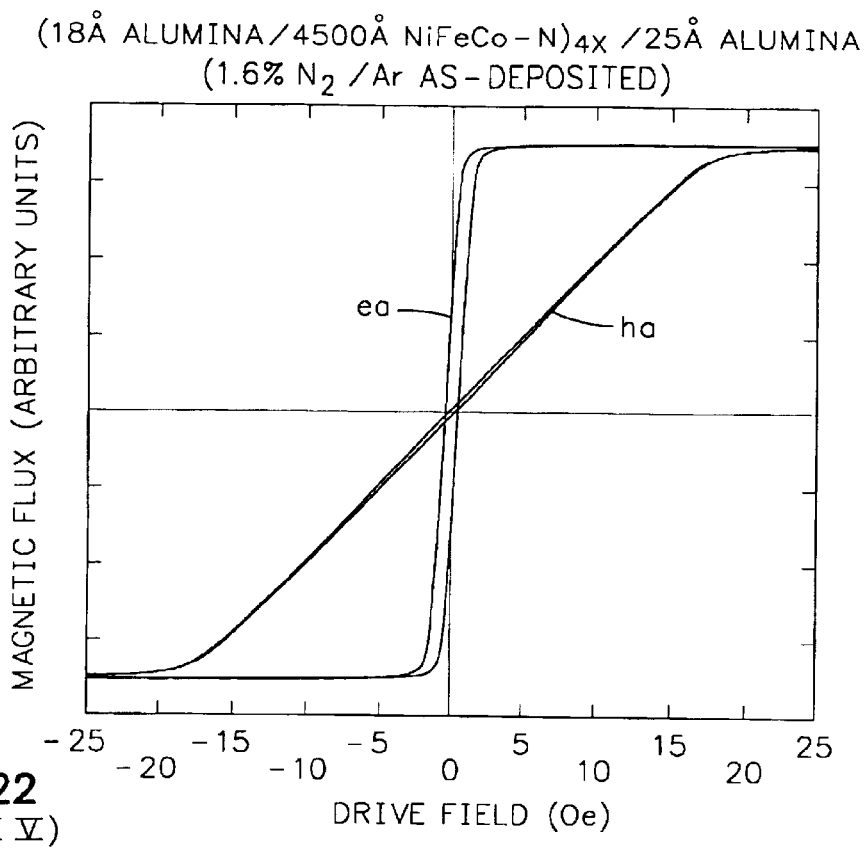
FIG. 22 is a B/H loop for Example V.

FIG. 20 is a B/H loop for Example I, FIG. 21 is a B/H loop for Example II and FIG. 22 is a B/H loop for Example V. The plots and the B/H loops are magnetic values before the aforementioned hard axis annealing. Before annealing Example I had vertical $H_K$ and after annealing it still had vertical $H_K$. In Example II the film structure had in-plane $H_K$ before annealing and in-plane $H_K$ after annealing. From FIG. 20 it can be seen that the uniaxial anisotropy of Example I was 31.0 Oe before annealing and each of the hard axis and easy axis coercivities $H_{CH}$ and $H_{CE}$ were 7.60 Oe. From the B/H loop in FIG. 21 it can be seen that the uniaxial anisotropy $H_K$ was 21.8 Oe, the hard axis coercivity $H_{CH}$ was 0.25 Oe and the easy axis coercivity $H_{CE}$ was 0.49 Oe. From FIG. 22 it can be seen that the uniaxial anisotropy $H_K$ was 17.9 Oe, the hard axis coercivity $H_{CH}$ was 0.20 Oe and the easy axis coercivity $H_{CE}$ was 0.47 Oe. The high hard axis and easy axis coercivities $H_{CH}$ and $H_{CE}$ of Example I are undesirable while the low hard axis and easy axis coercivities $H_{CH}$ and $H_{CE}$ Of Examples V and II are desirable.

It can be seen from Chart A that an optimized amount of process gas ($N_2$ or $N_2O$) can be employed for preventing vertical $H_K$ in relatively thick laminates. This optimized amount of process gas can also prevent switching of in-plane $H_K$ as seen in Examples II, IV, V and VI. It can be seen from Examples IV and V that the employment of $SiO_2$ or alumina interlayers makes little difference on the results. It can also be seen that $N_2O$ produces a higher $H_K$ than $N_2$ (Example II versus Example IV) with near zero magnetostriction and $\lambda$. The laminated structure in Example II is preferred with 3.2% $N_2O$ in Ar since it has excellent soft in-plane properties and near zero magnetostriction after hard axis annealing. In contrast, Examples I and III with no $N_2O$ or 4.8% $N_2O$ have high coercivities and vertical anisotropy. Accordingly, Chart A indicates that with properly selected conditions of pressure and no substrate bias that introduction of a prescribed amount of $N_2O$ dramatically improves the film properties.

tions in Chart A are each 4500 Å thick. The thinner films are more susceptible to anisotropy loss in hard axis annealing.

Chart B illustrates two methods in addition to reactive gas doping for making relatively thin NiFeCo films with good anisotropy, namely (1) depositing a NiFeCo—O—N seed layer with an optimized concentration of $N_2O$ in the process gas prior to depositing the main NiFeCo—O—N layer with a separately optimized $N_2O$ concentration, as shown in Examples X, XI and XII; and (2) using a $SiO_2$ underlayer, as shown in Example XIII.

Figure 15:
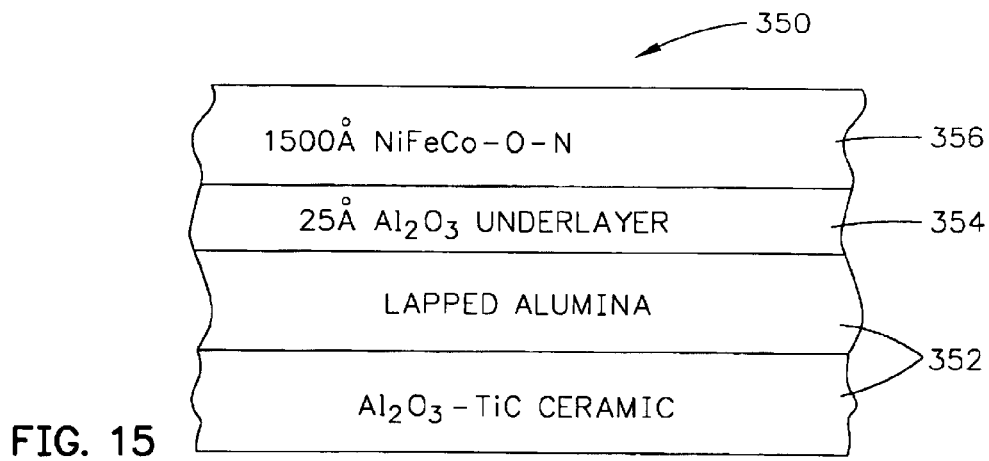
FIG. 15 is a schematic cross-sectional illustration of various layers employed in Examples VIII and IX.

Examples VIII and IX are shown by the film structure 350 in FIG. 15 which has a substrate 352 of $Al_2O_3$—TiC ceramic with lapped alumina. On the substrate is a 25 Å $Al_2O_3$ underlayer 354 and on the underlayer is a 1500 Å NiFeCo—

CHART A

Magnetic Properties of Selected NiFeCo-based Laminates Approximately 1.8 μm Thick After Hard Axis Annealing

| Example | Film Structure | Process Gas | $H_k$ (Oe) | $H_{ch}$ (Oe) | $H_{ce}$ (Oe) | $\lambda$ ($\times 10^{-6}$) | Anisotropy Type |
|---|---|---|---|---|---|---|---|
| I | (25 Å $SiO_2$/4500 Å NiFeCo)$_{4X}$/25 Å $SiO_2$ | Pure Ar | 10.4 | 2.63 | 2.60 | 0.26 | Vertical |
| II | (25 Å $SiO_2$/4500 Å NiFeCo—O—N)$_{4X}$/25 Å $SiO_2$ | 3.2% $N_2O$/Ar | 10.8 | 0.09 | 0.56 | 0.07 | In-plane |
| III | (25 Å $SiO_2$/4500 Å NiFeCo—O—N)$_{4X}$/25 Å $SiO_2$ | 4.8% $N_2O$/Ar | 19.7 | 7.07 | 7.32 | -0.73 | Vertical |
| IV | (25 Å $SiO_2$/4500 Å NiFeCo—N)$_{4X}$/25 Å $SiO_2$ | 1.6% $N_2$/Ar | 5.8 | 0.01 | 0.24 | 1.63 | In-plane |
| V | 18 Å alumina/4500 Å NiFeCo—N)$_{4X}$/25 Å alumina | 1.6% $N_2$/Ar | 5.5 | 0.01 | 0.26 | 1.65 | In-plane |
| VI | (25 Å $SiO_2$/4500 Å NiFeCo—O—N)$_{4X}$/25 Å $SiO_2$ | 1.6% $N_2O$/Ar | 8.0 | 0.03 | 0.35 | 0.78 | In-plane |

EXAMPLES VII–XIII

Figure 16:
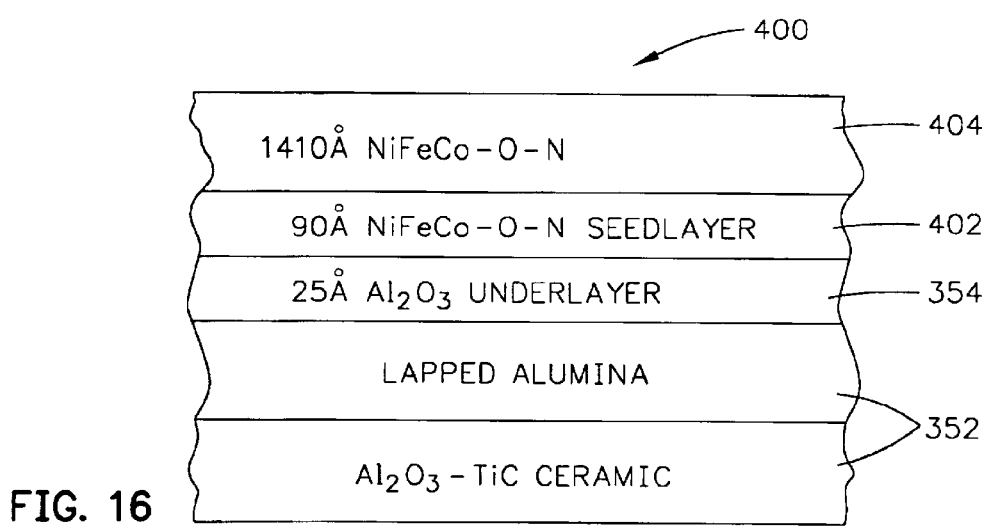
FIG. 16 is a schematic cross-sectional illustration of various layers employed in Examples X–XII.
Figure 17:
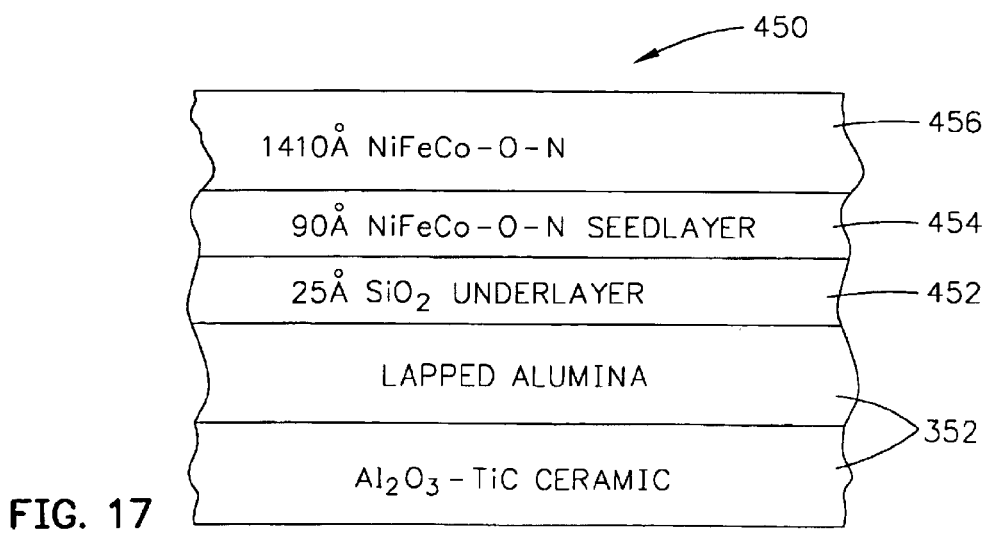
FIG. 17 is a schematic cross-sectional illustration of various layers employed in Example XIII.

Examples VII–XIII are shown in Chart B hereinbelow. A DC magnetron was employed with a $Ni_{73.2}Fe_{18.1}Co_{8.7}$ (wt %) target and the process gas was Ar or $N_2O$ in Ar. The power was 1750W and the pressure was $4.0 \times 10^{-3}$ mbar. The substrate was Al—TiC ceramic with a lapped alumina undercoat and the examples were annealed three times in an oven at 232° C. for 400 minutes on the hard axis. All of the film structures in Chart B had in-plane anisotropy. In Example VII the -3.7 for $H_K$ indicates that the easy axis switched to the original hard axis direction during the hard axis annealing. Each of the films are 1500 Å thick for the film structures in Chart B whereas the films for the lamina- O—N magnetic film 356. Example VII is the same as Example VIII except the magnetic film 356 is NiFeCo. Examples X, XI and XII are shown by the film structure 400 in FIG. 16 which has the same substrate 352 and underlayer 354, as shown in FIG. 15. On the underlayer 354 is a 90 Å NiFeCo—O—N seed layer 402 and on the seed layer is a 1410 Å NiFeCo—O—N magnetic film 404. Example XIII is shown by the film structure 450 in FIG. 17 which has the same substrate 352, as shown in FIGS. 14 and 15. On the substrate is a 25 Å $SiO_2$ underlayer 452, on the underlayer is a 90 Å NiFeCo—O—N seed layer 454 and on the seed layer is a 1410 Å NiFeCo—O—N magnetic film 456.

CHART B

Magnetic Properties of Selected 1500 Å NiFeCo-based Films After Hard Axis Annealing

| Example | Film Structure | Seed Layer Gas | Main Layer Gas | Sub. Bias (V) | $H_k$ (Oe) | $H_{ch}$ (Oe) | $H_{ce}$ (Oe) | $\lambda$ ($\times 10^{-6}$) |
|---|---|---|---|---|---|---|---|---|
| VII | 1500 Å NiFeCo | No seed | Pure Ar | -50 | -3.7 | 0.25 | 1.11 | 0.08 |
| VIII | 1500 Å NiFeCo—O—N | No seed | 2.4% $N_2O$/Ar | -50 | 2.6 | 0.49 | 0.98 | -0.12 |
| IX | 1500 Å NiFeCo—O—N | No seed | 2.4% $N_2O$/Ar | None | 3.2 | 0.54 | 1.01 | -0.56 |
| X | 90 Å NiFeCo—O—N/ 1410 Å NiFeCo—O—N | 2.4% $N_2O$/Ar | 1.6% $N_2O$/Ar | None | 3.3 | 0.58 | 0.97 | 0.11 |
| XI | 90 Å NiFeCo—O—N/ 1410 Å NiFeCo—O—N | 4.0% $N_2O$/Ar | 2.4% $N_2O$/Ar | None | 3.5 | 0.55 | 0.98 | -0.65 |
| XII | 90 Å NiFeCo—O—N/ 1410 Å NiFeCo—O—N | 4.0% $N_2O$/Ar | 1.6% $N_2O$/Ar | None | 4.2 | 0.55 | 0.98 | 0.04 |

CHART B-continued

Magnetic Properties of Selected 1500 Å NiFeCo-based Films After Hard Axis Annealing

| Example | Film Structure | Seed Layer Gas | Main Layer Gas | Sub. Bias (V) | $H_k$ (Oe) | $H_{ch}$ (Oe) | $H_{ce}$ (Oe) | $\lambda$ (×10$^{-6}$) |
|---|---|---|---|---|---|---|---|---|
| XIII | 25 Å SiO$_2$/90 Å NiFeCo—O—N/ 1410 Å NiFeCo—O—N | 4.0% N$_2$O/Ar | 1.6% N$_2$O/Ar | None | 6.0 | 0.57 | 0.94 | −0.21 |

A comparison of Examples VII and VIII shows that adding an optimal amount of N$_2$O (2.4% in this case) to the process gas prevents switching of the easy axis during hard axis annealing. Further increase in $H_K$ (from 2.6 to 3.2 Oe) occurs when the substrate bias decreases from −50V to none (Example IX). Examples X, XII and XI illustrate the effect of introducing a 90 Å NiFeCo—O—N seed layer and then optimizing the N$_2$O separately for the seed layer and the main layer. Only small increases in $H_K$ occur when the N$_2$O for the seed and main layers are changed alone (Examples X and XI). An optimal combination of N$_2$O for the seed and main layers (4.0% and 1.6%, respectively) results in an increase in $H_K$ from 3.3 Oe (Example IX) to 4.7 Oe (Example XII). A significant further increase in $H_K$ is obtained by using an SiO$_2$ underlayer to the NiFeCo—O—N seeded structure, as shown in Example XIII, where $H_K$ is 6.0 Oe after hard axis annealing. Without the SiO$_2$ underlayer, the NiFeCo—O—N structure is deposited on a lapped alumina surface. Clearly, the nature of the amorphous underlayer plays a large role in the hard axis annealing resistance of these thin films.

Examples XIV–XV

Figure 23:
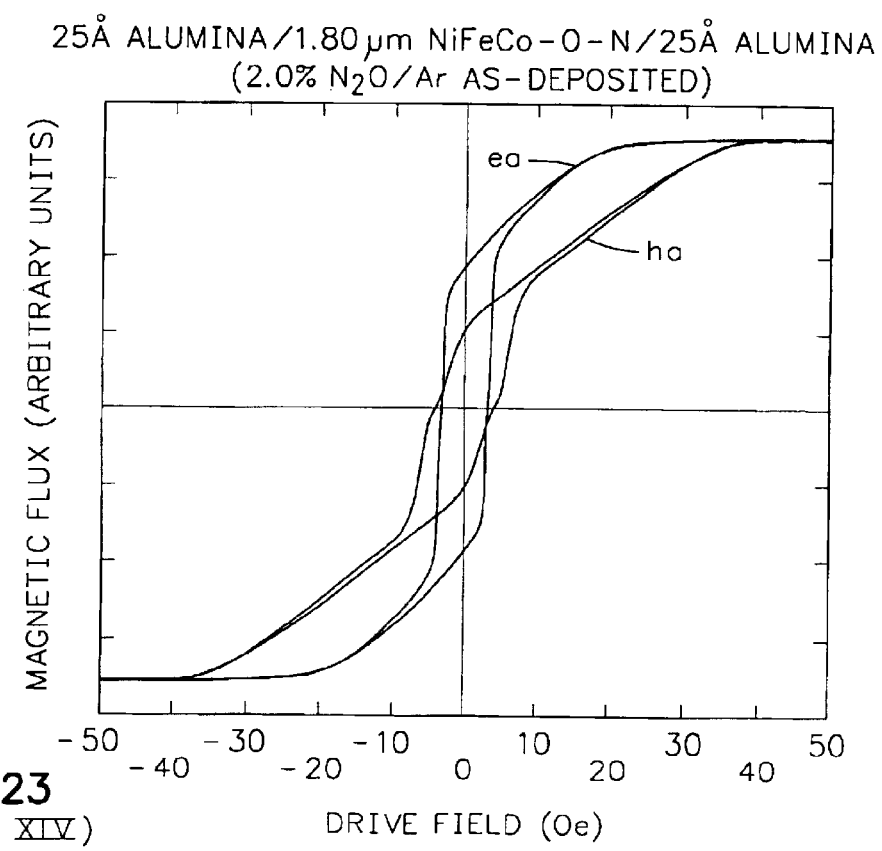
FIG. 23 is a B/H loop for Example XIV.

Examples XIV and XV are shown in FIGS. 18 and 23 respectively. Example XIV is a single layer film of NiFeCo—O—N which is about 1.8 μm thick and has vertical $H_K$. The process gas was 2.0% N$_2$O in Ar. The easy axis and hard axis loops are shown in FIG. 23 wherein $H_K$ prior to annealing was 20.6 Oe, the hard axis coercivity $H_{CH}$ was 4.19 Oe and the easy axis coercivity $H_{CE}$ was 3.33 Oe. The vertical anisotropy and the high easy axis and hard axis coercivities are unacceptable.

Figure 24:
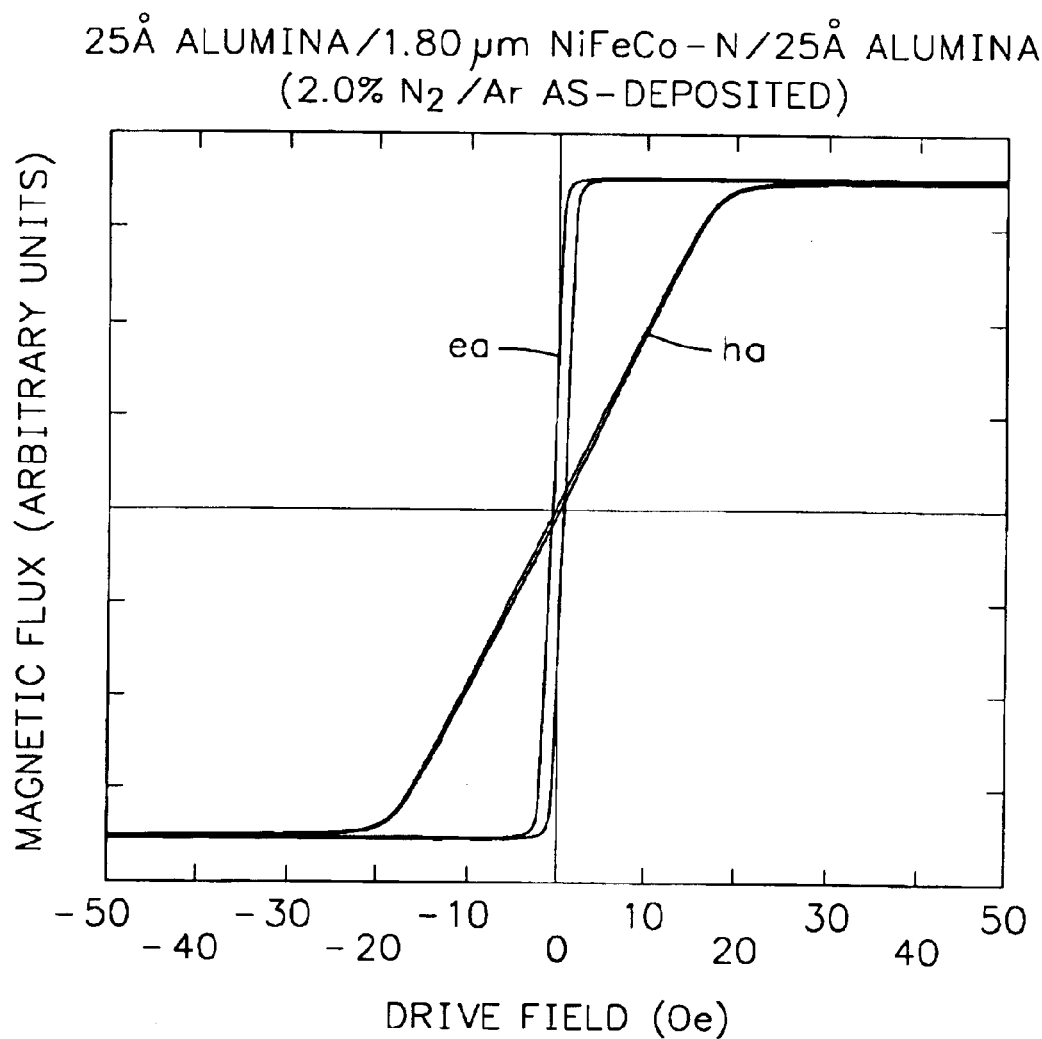
FIG. 24 is a B/H loop for Example XV.

Example XV is shown in FIGS. 19 and 24. It can be seen from FIG. 19 that Example XV is a 1.8 μm thick single NiFeCo—N film, which has a desirable in-plane $H_K$. From FIG. 24 it can be seen that the $H_K$ before annealing is 18.0 Oe, the hard axis coercivity $H_{CH}$ was 0.34 Oe and the easy axis coercivity $H_{CE}$ was 0.72 Oe. The hard axis and easy axis coercivities are low, which is desirable.

It can be seen in FIG. 18 that with a process gas having a N$_2$O content from 1.5% to 3.2% a single layer film of NiFeCo—O—N can be obtained with in-plane $H_K$ UP to approximately 0.6 μm. FIG. 18 also shows that laminated films of NiFeCo—O—N 4500 Å (0.45 μm) thick laminated four times can be produced with a total thickness of 1.8 μm with in-plane $H_K$. FIG. 19 shows that with a process gas having a range from 1% to 2% N$_2$ in Ar that single layer films of NiFeCo—N up to 1.8 μm can be fabricated with in-plane $H_K$.

Figure 25A:
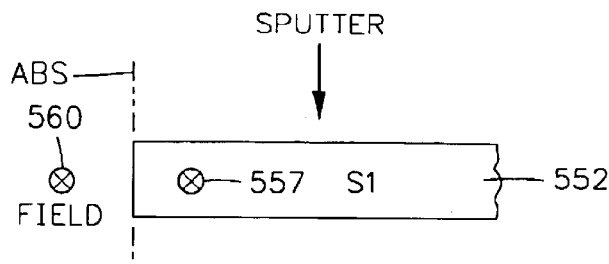
FIGS. 25A–25H are side views of portions of layers that are constructed in a merged MR head.
Figure 25B:
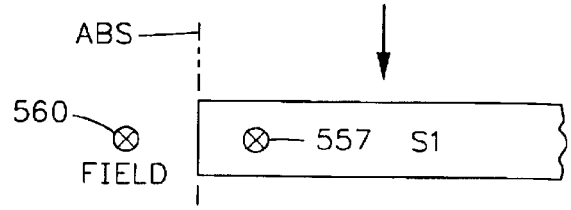
Figure 25C:
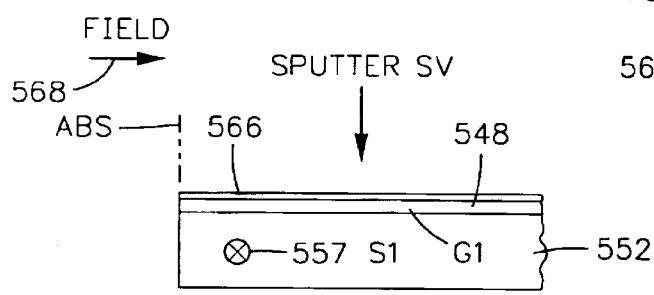
Figure 25D:
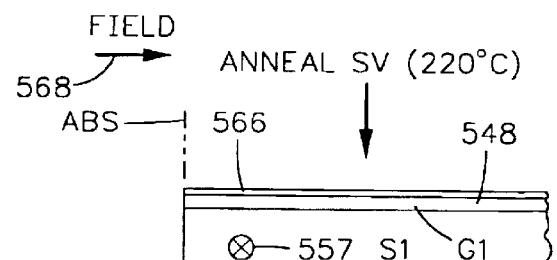
Figure 25E:
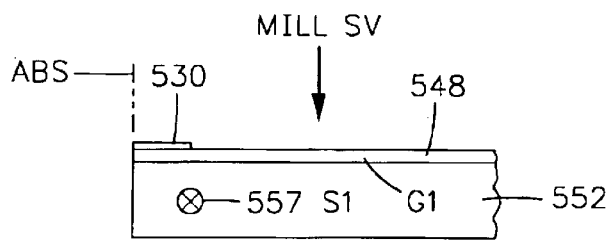
Figure 25F:
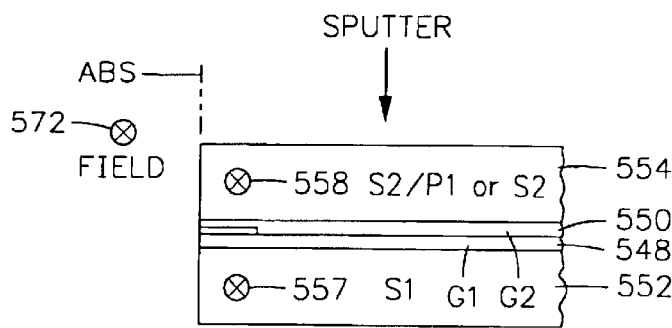

FIGS. 25A–25F illustrate the manufacture of the read head 472 with the NiFeCo[—O]—N shield layers with various processing temperatures and fields exerted on the first and second shield layers 552 and 554. In FIG. 25A, the first shield layer 552 is sputtered in the presence of a field 560 of about 50 Oe that is directed parallel to the ABS 562 and in the plane of the first shield layer 552. This causes the easy axis 557 of the first shield layer 552 to be directed in the same direction, namely parallel to the ABS and parallel to the plane of the first shield layer 552. As shown in FIG. 25B, the first shield is then annealed at a temperature of about 270° C. for 2 hours in the presence of a field of about 1,500 Oe that is directed parallel to the ABS in the plane of the first shield layer. As shown in FIG. 25C, after sputter depositing a nonmagnetic electrically insulative first gap layer (G1) 548, a spin valve (SV) material layer 566 may be formed by sputtering in the presence of a field 568 that is directed perpendicular to the ABS 562. The field 568, which may be directed either to the right or to the left, is for the purpose of orienting the magnetic spins of the antiferromagnetic pinning layer 532 in FIG. 11 in a desired direction that pins the magnetic moment of the pinned layer 531 in FIG. 11 in the same direction. After deposition, the structure is annealed at a high temperature, such as 220° C., in the presence of a magnetic field of 13000 Oe that is oriented perpendicular to the ABS (FIG. 25D). Unfortunately, the step shown in FIG. 25D may reposition the orientation of the magnetic domains of the first shield layer 552, which will be discussed in more detail hereinafter. In FIG. 25E the spin valve layer 566 is photopatterned and milled to provide a spin valve sensor 530. In FIG. 25F, after sputter depositing a nonmagnetic insulative second gap layer 550, the second shield (S2 shown in FIG. 6) or second shield/first pole piece (S2/P1 in FIG. 7) layer 554 is formed by sputtering in the presence of a field 572 which is directed parallel to the ABS 562 and in the plane of the S2/P1 layer, such as into the paper as shown by ⓧ. This establishes the easy axis 558 of the second shield (S2) or second shield/first pole piece (S2/P1) layer 554 parallel to the ABS in the plane of the S2/P1 layer. This means that the magnetic domains of the second shield/first pole piece layer 554 will likewise be oriented parallel to the ABS.

Figure 25G:
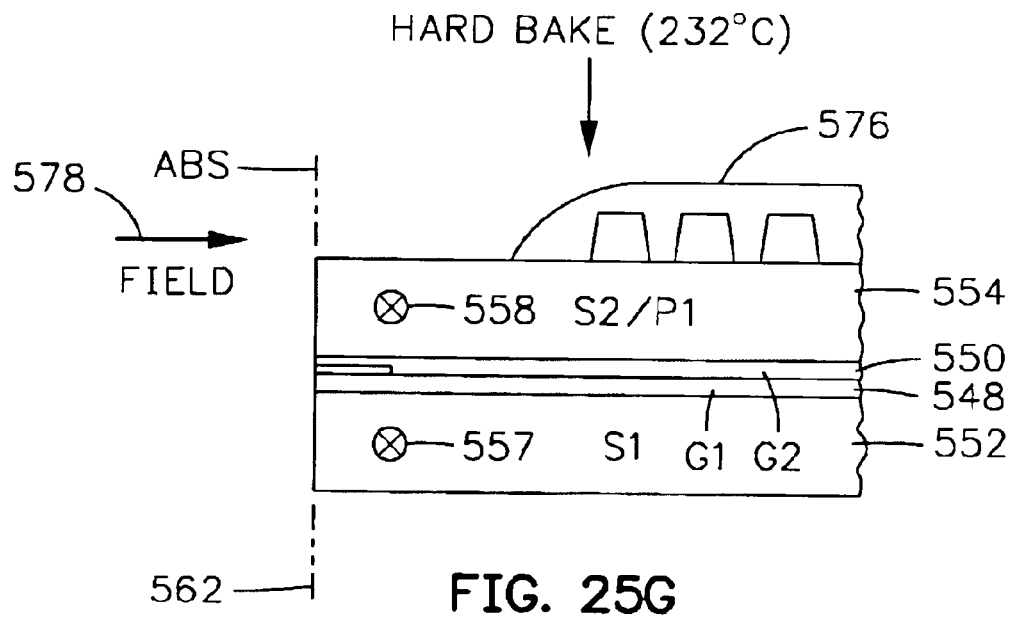
Figure 25H:
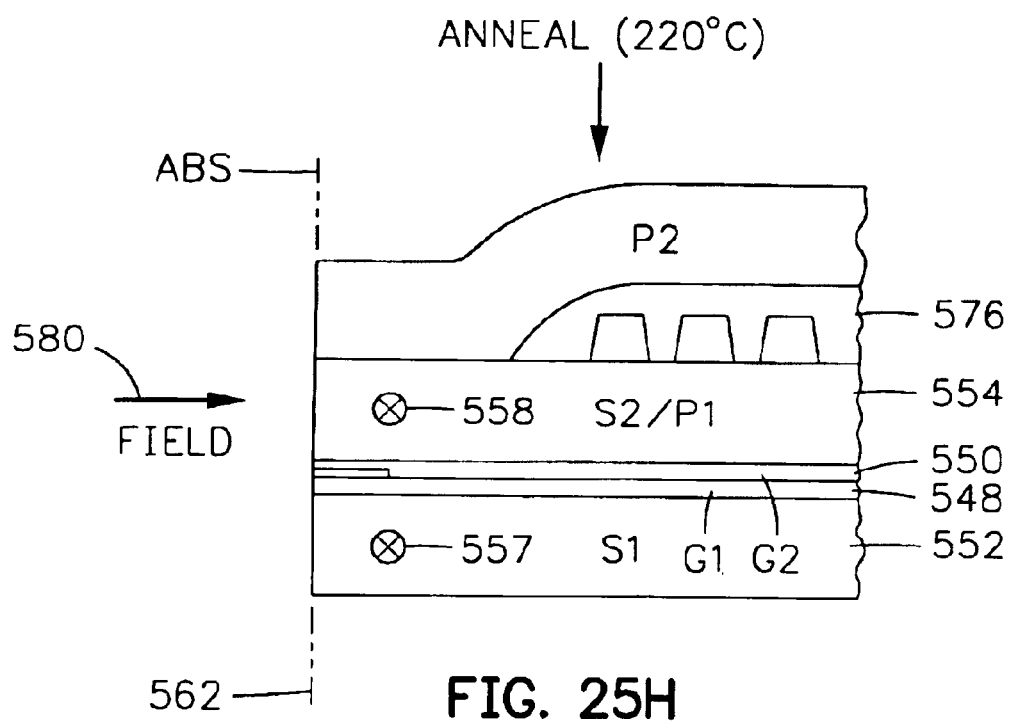

FIGS. 25G and 25H illustrate the manufacture of the write head 70 formed on top of read head 72 (as illustrated in FIG. 7 for a merged head). In FIG. 25G, various layers of the insulation stack 576 are hard baked at a high temperature, such as 232° C., in the presence of a field 578 of about 1500 Oe which is directed perpendicular to the ABS 562 for the purpose of maintaining the orientation of the magnetic spins of the pinning layer 532 in FIG. 11 directed perpendicular to the ABS. Unfortunately, this process may reorient the magnetic domains of the first and second shield layers 552 and 554, from their easy axis positions 557 and 558, which will be discussed in more detail hereinafter. In FIG. 25H, after completion of the magnetic head, the magnetic spins of the pinning layer 532 in FIG. 11 are reset by annealing at a high temperature of about 220° C. in the presence of a field 580 of about 13,000 Oe which is again directed perpendicular to the ABS 562. Again, this processing step may reorient the magnetic domains of the shield layers from the easy axes 557 and 558, which will be described in more detail hereinafter. It should be noted that if the magnetic domains aligned along the easy axes 557 and 558 are moved from their aligned positions they will be magnetically unstable to signal fields from a rotating magnetic disk.

Figure 26:
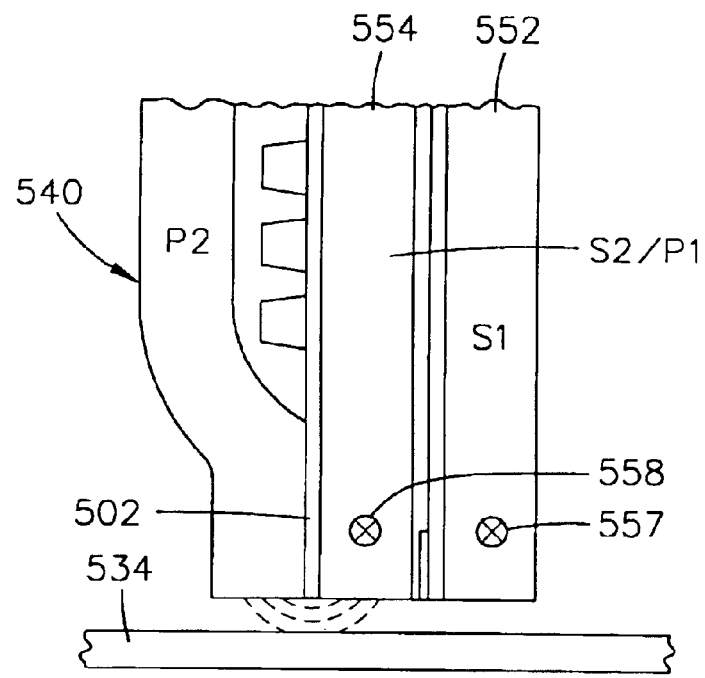
FIG. 26 is an elevation view of a portion of a merged MR head writing signals into a rotating magnetic disk.
Figure 27:
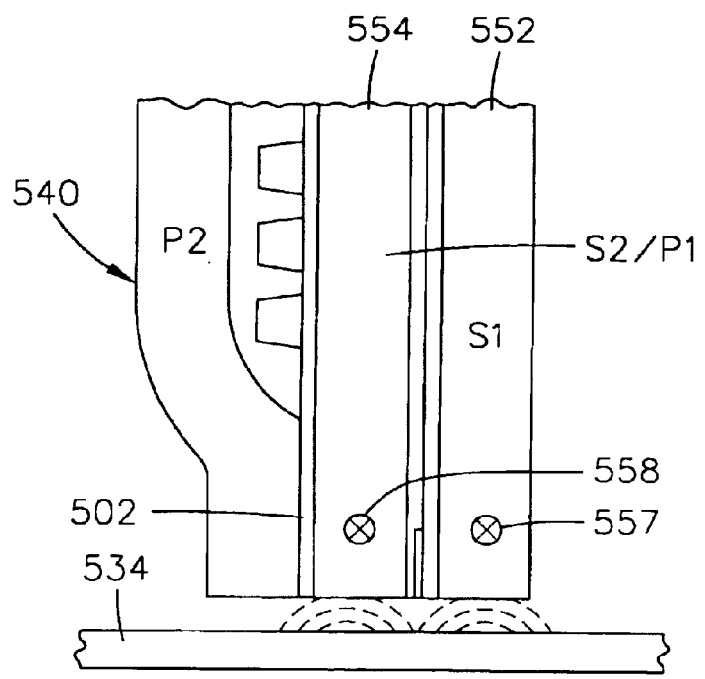
FIG. 27 is the same as FIG. 19 except the disk is injecting magnetic signals into the magnetic head.

FIG. 26 shows magnetic flux fringing across the gap layer 502 of the write head portion of the magnetic head 540. This flux can move the magnetic domains of the first and second shield layers 552 and 554 to various positions if the magnetic domains are not aligned along the easy axes 557 and 558. In the same manner, as shown in FIG. 27, magnetic fields from the rotating magnetic disk 434 may move the magnetic domains of the first and second shield layers 552 and 554 if the magnetic domains are not aligned along the easy axes 557 and 558. If the magnetic domains of either of the layers 552 or 554 move around during operation of the head, this will cause what is known in the art as Barkhausen noise which seriously interferes with the read signal of the read head portion of the magnetic head.

Figure 28A:
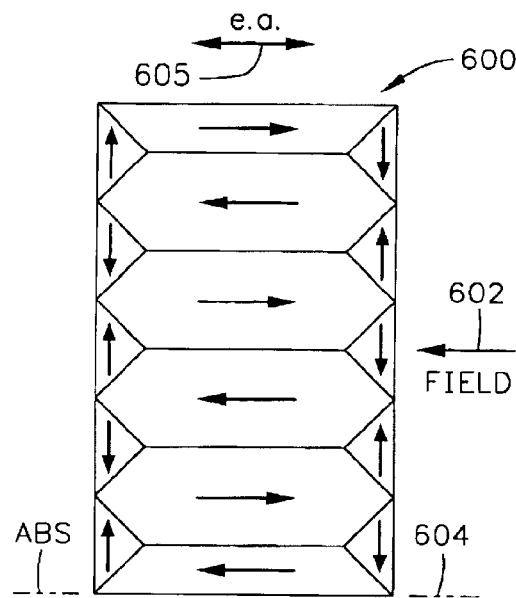
FIGS. 28A–28C are plan views of the prior art shield or pole piece layer of the magnetic head with magnetic domains shown schematically in various conditions.
Figure 28B:
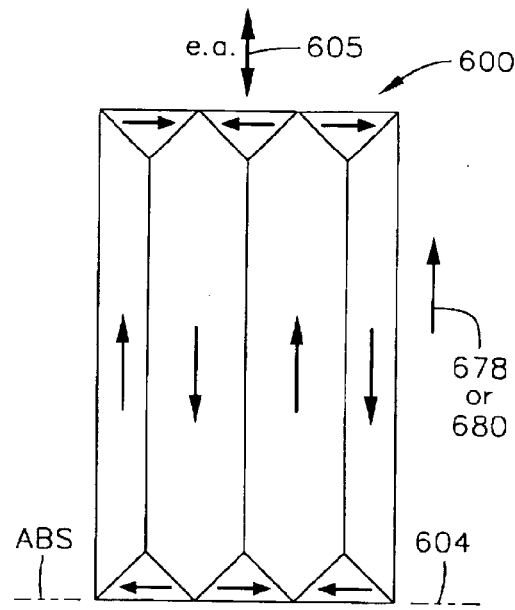
Figure 28C:
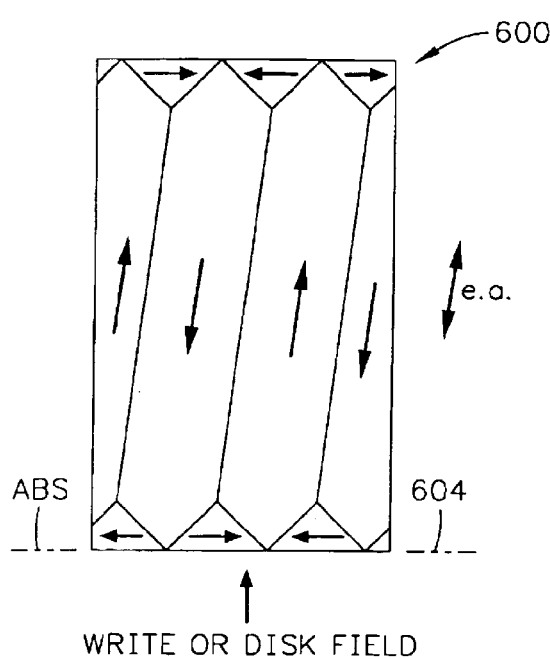

FIGS. 28A–28C show magnetic domain configurations for prior art material, such as NiFe, used for first and second shield layers. In FIG. 28A, a prior art first shield material is plated or sputter deposited in the presence of a field 602 which is directed parallel to the ABS 604 in the plane of the layer. This causes the magnetic domains, which are elongated diamonds, to align with their longitudinal axes parallel to the field 602 and with an easy axis 605. The shield layer is then subjected to annealing at a temperature of 270° C. for 2 hours in the presence of a field of 1,500 Oe directed parallel to the ABS in the plane of the shield layer. In FIG. 28B, the first or second shield layer 600 is subjected to hard baking of the insulation layers of the write head in the presence of a field 578 perpendicular to the ABS, as shown in FIG. 25G, or subjected to annealing in the presence of a field 580 to orient the magnetic spins of the pinning layer 532 in FIG. 11. The annealing reduces the intrinsic magnetic anisotropy ($H_K$) of the first and/or second shield layers. In conjunction with an unfavorable stress induced anisotropy field, this can cause the magnetic domains to switch their positions from parallel to the ABS, as shown in FIG. 28A, to perpendicular to the ABS, as shown in FIG. 28B. Unfortunately, this is a very unstable position for magnetic domains when they encounter signal fields during the operation of the head. In FIG. 28C a write field, such as 200 Oe, or a disk field, such as 50 Oe, is applied to the first or second shield layer 600 which causes the magnetic domains to move from their position perpendicular to the ABS. This movement causes Barkhausen noise which is a problem obviated by the present invention. Accordingly, it is important that the intrinsic anisotropy ($H_K$) of the shield be higher so that even after annealing in a field perpendicular to the ABS, the shield retains sufficient anisotropy field ($H_K$). Alternatively, the shield material may become isotropic, thereby losing its intrinsic anisotropy ($H_K$).

FIGS. 29A–29D illustrate plan views of a first or second shield layer 700 of the present invention wherein the magnetic domains are not destabilized by subsequent processing steps nor are they moved by applied fields during operation of the head. This is accomplished by employing a NiFeCo [—O]—N material processed according to the present invention.

Figure 29A:
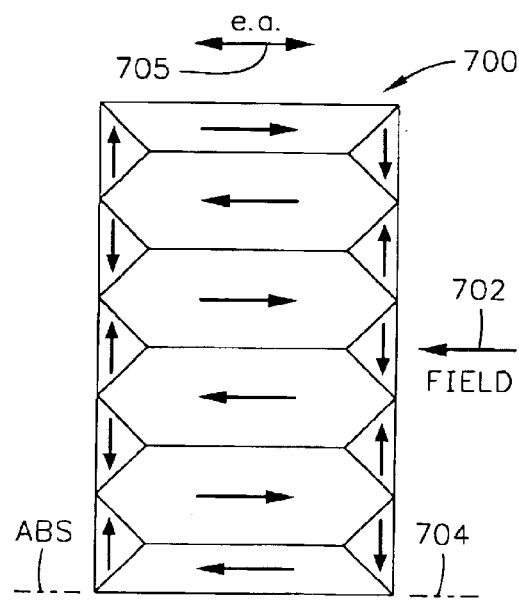
FIGS. 29A–29D are plan views of a shield or pole piece layer of a magnetic head with magnetic domains shown schematically under various applied field conditions.
Figure 29B:
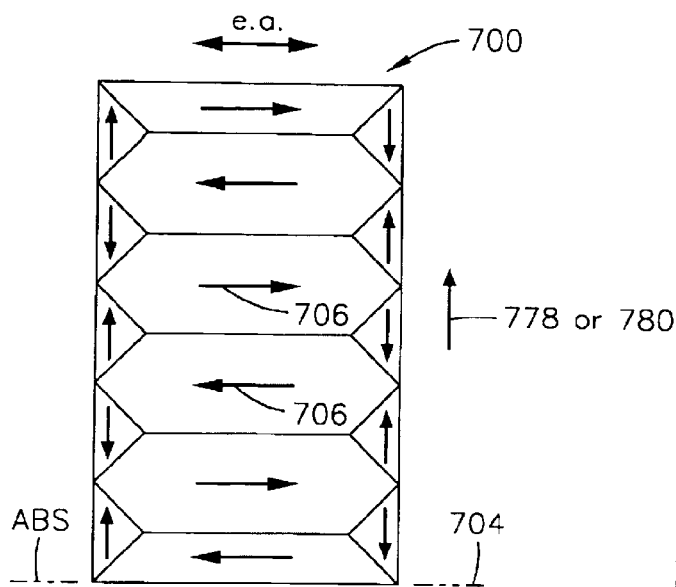
Figure 29C:
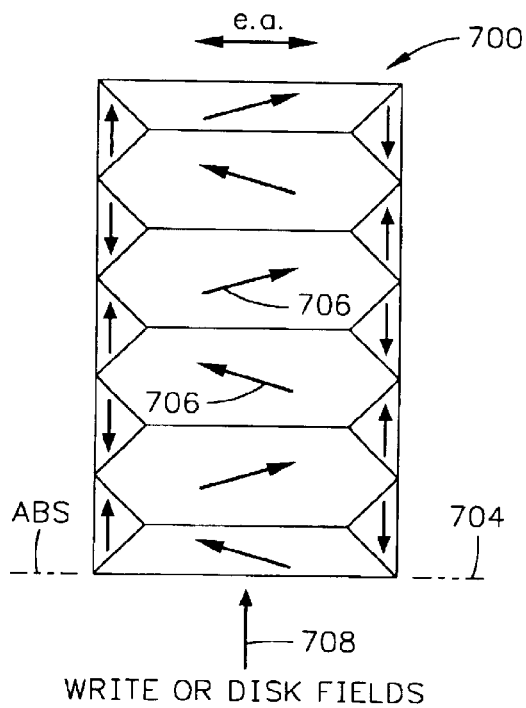
Figure 29D:
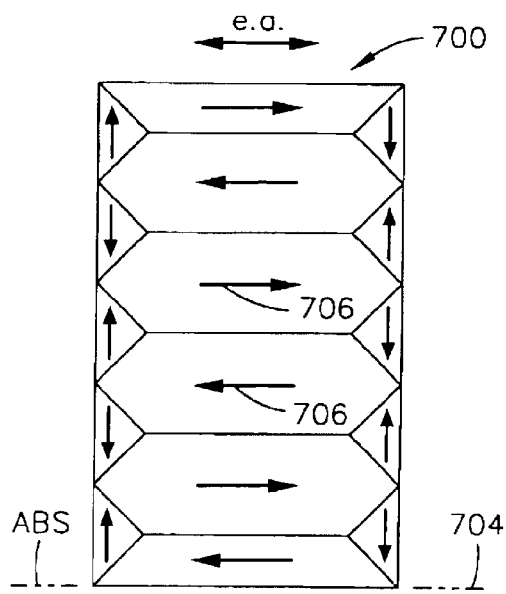

In FIG. 29A the first and/or second shield layer 700 is constructed of the NiFeCo[—O]—N material. It may be sputter deposited in the presence of a field 702 which is parallel to the ABS 704 and the plane of the shield layer. This establishes the easy axis 705 parallel to the ABS and the longitudinal axes of the magnetic domains parallel to the ABS as shown. In the case of a first shield layer, it may also be annealed with the same field as described in reference to FIG. 25A. It is desirable that this orientation of the magnetic domains be retained during subsequent construction and operation of the head. In FIG. 29B the layer 700 has been subjected to hard baking and a field 578, as shown in FIG. 25G, or to annealing in the presence of a field 580 for resetting, as shown in FIG. 25H. Since the intrinsic anisotropy ($H_K$) of the NiFeCo[—O]—N material is higher, the shield can tolerate a greater loss of anisotropy during annealing and still retain sufficient intrinsic anisotropy to maintain the domains parallel to the ABS, even in the presence of possibly unfavorable stress induced anisotropy. In FIG. 29C, the layer 700 is subjected to applied fields from the write head or from the disk as shown in FIGS. 26 and 27 which will cause the magnetic moments 706 to rotate, as shown. However, the magnetic domains retain their parallel orientation. Upon the removal of the operational applied fields 708 the magnetic moments 706 return to their parallel orientations, as shown in FIG. 29D. Accordingly, after construction of the first shield and/or second shield/first pole piece layer 700, as shown in FIG. 29A, the magnetic domains are not reoriented during the processing steps in FIG. 29B and do not move during operation of the head as shown in FIG. 29C. This results in the elimination of the aforementioned Barkhausen noise which degrades the performance of the read head.

Discussion

It can be seen from chart A that the best laminate structure is Example II where the process gas includes 3.2% $N_2O$. Example II has the highest in-plane $H_K$ of all of the examples. From Chart B it can be seen that the best single layer film was constructed with a process gas of 1.6% of $N_2O$ with an underlayer constructed with a process gas having 4.0% $N_2O$ on an underlayer of $SiO_2$. This film structure had an in-plane $H_K$ of 6.0. Examples IV and V in Chart A show that a laminate film can be processed or constructed with a process gas of 1.6% $N_2$ with a resulting in-plane $H_K$ of 5.8 or 5.5. FIG. 18 shows that 4× laminated films can be constructed with a process gas containing 1.5% to 3.2% $N_2O$ with a thickness of 1.8 $\mu$m with in-plane $H_K$. FIG. 19 shows that single layer films 1.8 $\mu$m thick can be constructed with a process gas in the range of 1% to 2% $N_2$. Accordingly, the best structure is Example II with its high $H_K$ of 10.8 Oe. Such a structure would be especially useful for the yoke portion of the second pole piece of the write head since the thinner (4500 Å) laminated layers have better domain structures for high frequency writing than thicker layers. However, the laminated structure is more difficult to fabricate because of the numerous layers. For this reason it is more practical to construct the first and/or shield layers of the read head of a single NiFeCo—N film, as shown in FIG. 19. A preferred shield layer or second shield/first pole piece common layer is preferably constructed with the aforementioned 1% to 2% $N_2$ in the process gas resulting in a 1.8 $\mu$m thick structure, as shown in FIG. 19. Optional shield, or combined shield and first pole structures, would be (25 Å $SiO_2$/4500 Å NiFeCO—O—N)$_{4x}$/2500 Å $SiO_2$ sputtered at 2.0×10$^{-3}$ mbar in 3.2% $N_2O$/Ar process gas. Another option for the shields or combined second shield/first pole piece common layer is (18 Å alumina/4500 Å NiFeCo—N)$_{4x}$/2500 Å alumina sputtered at 2.0×10$^{-3}$ mbar and 1.6% $N_2$/Ar. An exemplary yoke structure is (25 Å $SiO_2$/90 Å NiFeCo—O—N/1410 Å NiFeCo—O—N)$_{16x}$/25 Å $SiO_2$ which equals 2.44 μm sputtered at 4.0×10⁻³ mbar with 4.0% $N_2O$/Ar for a seed layer and 1.6% $N_2O$/Ar for a main layer of each NiFeCo—O—N laminate layer.

It can be seen from the above that the use of optimal amounts of $N_2O$ or $N_2$ in the process gas in sputtering NiFeCo—O—N or NiFeCo—N films and laminates produces film structures that retain anisotropy after hard axis annealing. For thin layers a separately optimized NiFeCo—O—N seed layer and amorphous underlayer further increases $H_K$ after hard axis annealing.

It should be understood with the NiFeCo material that the Co content can be adjusted to control the $H_K$. An increase in Co increases $H_K$. The magnetostriction λ can be controlled by adjusting the Fe content. NiFeCo has high thermal conductivity which is even higher than presently used Sendust. The only problem with NiFeCo is that when the film thickness is greater than about 4000 Å the film develops vertical anisotropy, which means that the magnetization at least partially is oriented out of the plane of the film. This creates domains in the film which interfere with stable sensor operation. The aforementioned invention employs a particular process gas in a DC magnetron sputtering system under appropriate conditions for maintaining the desired in-plane anisotropy.

From FIG. 18 it can be seen that doping the process gas with less than 1.5% $N_2O$ or greater than 3.2% $N_2O$ may result in single film structures having a vertical $H_K$, and that doping with less than 1.6% or greater than 3.2% of $N_2O$ for a laminated film may result in vertical $H_K$. Accordingly, there is a small range of doping with $N_2O$ that is acceptable for producing films with in-plane $H_K$. The same is true for FIG. 19 when $N_2$ is used for doping the process gas. Below 1% and above 2% may result in films having a vertical $H_K$ SO that a narrow range of 1% to 2% $N_2$ in a process gas is known to produce films with an in-plane $H_K$.

The preferred range for the various amounts of Ni, Fe and Co in the NiFeCo target of the magnetron sputtering system is $(Ni_{0.80+x}Fe_{0.20-x})_{1-y}Co_Y$ where $-0.05 \leq x \leq 0.05$ and $0.00 \leq y \leq 0.15$ (wt. fraction). A Co addition up to 0.15 (15%) still results in a soft magnetic film. It should be understood that the process gas may be doped with any nitrogen-containing gas other than $N_2O$ or $N_2$, such as $NH_3$, $NO_2$, NO or $NF_3$. It should be understood that the DC magnetron is preferred to an RF magnetron. As mentioned hereinabove, the magnets of the DC magnetron may be employed for orienting the easy axis of the sputtered films. Optionally, the sputter films can be located further away from the magnetron and magnets on the substrate may be employed for orienting the easy axis.

It should further be understood that the films in the laminated film may each be in a range from 500 Å to 2.0 μm with the interlayer being in a range from 5 Å to 100 Å. The range of thickness for the single layer may be 4500 Å to 3 μm. The interlayer material may be alumina, $SiO_2$, or other nonmagnetic material. The seed layers in each of examples X–XIII in Chart B may have a thickness range from 25 Å to 200 Å. It should be noted from FIG. 18 that a 4× laminated film structure is better than a 2× laminated film structure. It should be understood, however, that the number of laminated magnetic films may be in a range from 2× to 30×.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a magnetic layer with in-plane anisotropy and high $H_K$ after hard axis annealing in the presence of a field perpendicular to the plane comprising the steps of:

providing a DC magnetron which has a chamber, a target and a substrate;

the target being NiFeCo;

providing a first process gas in the chamber which is composed of an inert gas and a nitrogen containing gas;

sputtering the target to form said magnetic layer composed of NiFeCo—O—N or NiFeCo—N on the substrate; and hard axis annealing the magnetic layer in the presence of a magnetic field perpendicular to a major plane of the magnetic layer until the magnetic layer has an $H_K$ from 2.6 Oe to 6.0 Oe and in-plane anisotropy.

2. A method as described in claim 1 wherein no bias is applied to the substrate.

3. A method as described in claim 1 wherein the first process gas includes 1.6% to 3.2% $N_2O$ and the magnetic layer includes multiple sputtered NiFeCo—O—N or NiFeCo—N films.

4. A method as described in claim 1 wherein the first process gas includes 1.6% to 3.2% $N_2O$ and the magnetic layer is a single film 2,500 Å to 6,000 Å thick.

5. A method as described in claim 1 wherein the first process gas includes 1.0% to 2.0% $N_2$ and the magnetic layer is a single film 4,500 Å to 18,000 Å thick.

6. A method as described in claim 1 wherein the target is $(Ni_{0.80+x}Fe_{0.20-x})_{1-y}Co_y$ where $-0.05 \leq x \leq 0.05$ and $0.00 \leq y \leq 0.15$ (weight fraction).

7. A method as described in claim 1 wherein the first process gas is said inert gas and $N_2$ and the target is sputtered to form the magnetic layer of at least a single film of NiFeCo—N about 1.8 μm thick.

8. A method as described in claim 7 wherein the first process gas includes 1.0% to 2.0% $N_2$.

9. A method as described in claim 8 wherein during sputtering the first target, a pressure between 1×10⁻³ to 3×10⁻³ mbar is maintained within said chamber and the magnetic layer comprises one or more films of NiFeCo—N from 4,500 Å to 18,000 Å thick.

10. A method as described in claim 1 including:

the first process gas being said inert gas and $N_2O$;

sputter depositing multiple interlayer films of $Al_2O_3$ or $SiO_2$; and sputtering the target multiple times to deposit multiple NiFeCo—O—N magnetic films;

and alternating the depositions to form the magnetic layer as a lamination of magnetic and interlayer films.

11. A method as described in claim 10 wherein the first process gas includes 1.6% to 3.2% $N_2O$ and each of the NiFeCo—O—N films is about 4,500 Å thick.

12. A method as described in claim 10 wherein no bias is applied to the substrate.

13. A method of making a magnetic layer with in-plane anisotropy and high $H_K$ after hard axis annealing in the presence of a field perpendicular to the plane comprising the steps of:

providing a DC magnetron which has a chamber, a target and a substrate;

the target being NiFeCo;

providing a first process gas in the chamber which is composed of an inert gas and $N_2O$;

sputtering the target to form said magnetic layer composed of NiFeCo—O—N or NiFeCo—N on the substrate;

sputter depositing multiple interlayer films of Al$_2$O$_3$ or SiO$_2$;

sputtering the target multiple times to deposit multiple NiFeCo—O—N magnetic films;

alternating the depositions to form the magnetic layer as a lamination of magnetic and interlayer films;

hard axis annealing the magnetic layer at about 232° C. in the presence of magnetic field perpendicular to a major plane of the magnetic layer for about 400 minutes; and after said hard axis annealing, the magnetic layer having an H$_K$ from 2.6 Oe to 6.0 Oe and in plane anisotropy.

14. A method of making a magnetic layer with in-plane anisotropy and high H$_K$ after hard axis annealing in the presence of a field perpendicular to the plane comprising the steps of:

providing a DC magnetron which has a chamber, a target and a substrate;

the target being NiFeCo;

providing a first process gas in the chamber which is composed of an inert gas and N$_2$O;

sputtering the target to form said magnetic layer composed of NiFeCo—O—N or NiFeCo—N on the substrate;

before sputtering the target, sputter depositing a seed layer of NiFeCo—O—N with a second process gas that has a higher N$_2$O content than the first process gas;

sputter depositing multiple interlayer films of Al$_2$O$_3$ or SiO$_2$;

sputtering the target multiple times to deposit multiple NiFeCo—O—N magnetic films; and alternating the depositions to form the magnetic layer as a lamination of magnetic and interlayer films.

15. A method as described in claim 14 wherein the seed layer is 25 Å to 200 Å thick.

16. A method as described in claim 14 including:

before sputter depositing the seed layer, sputter depositing a bottom layer of SiO$_2$ so that the seed layer is located between the bottom layer and the magnetic layer.

17. A method as described in claim 14 wherein the N$_2$O content in the second process gas is from 2.4% to 4.0%.

18. A method as described in claim 17 wherein no bias is applied to the substrate.

19. A method as described in claim 18 including:

before sputter depositing the seed layer, sputter depositing a bottom layer of SiO$_2$ so that the seed layer is located between the bottom layer and the magnetic layer.

20. A method as described in claim 19 wherein the seed layer is 25 Å to 200 Å thick.

21. A method as described in claim 20 wherein the bottom layer is about 25 Å thick.

22. A method as described in claim 21 wherein four NiFeCo—O—N magnetic films are deposited with each magnetic film being about 4500 Å thick and each interlayer film being about 25 Å thick.

* * * * *